(12) United States Patent
Tamura et al.

(10) Patent No.: US 7,383,092 B2
(45) Date of Patent: Jun. 3, 2008

(54) INFORMATION PROCESSING APPARATUS AND METHOD, AND PROGRAM

(75) Inventors: Hidefumi Tamura, Tokyo (JP); Kouji Goto, Kanagawa (JP); Shinji Tokunaga, Tokyo (JP); Daisuke Yoshitake, Tokyo (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 11/348,558

(22) Filed: Feb. 7, 2006

(65) Prior Publication Data
US 2006/0190114 A1 Aug. 24, 2006

(30) Foreign Application Priority Data
Feb. 24, 2005 (JP) ............................. 2005-049414

(51) Int. Cl.
  *G06F 19/00* (2006.01)
(52) U.S. Cl. ............................. 700/98; 716/1; 326/41
(58) Field of Classification Search .................. 700/98; 716/8, 9, 11; 326/41, 47; 345/419, 420
See application file for complete search history.

(56) References Cited

U.S. PATENT DOCUMENTS 6,665,854 B2 * 12/2003 Fujiwara et al. ............... 716/15
2002/0046387 A1 * 4/2002 Matsushita et al. ............. 716/1
2003/0189566 A1 * 10/2003 Fuki et al. ................... 345/419
2006/0070015 A1 * 3/2006 Iwaki et al. .................. 716/11
2007/0079276 A1 * 4/2007 Ashida et al. ................. 716/15

* cited by examiner

*Primary Examiner*—Paul Rodriguez
*Assistant Examiner*—Sheela Rao
(74) *Attorney, Agent, or Firm*—Oblon, Spivak, McClelland, Maier & Neustadt, P.C.

(57) ABSTRACT

In an information processing apparatus for displaying models representing shapes to assist design of a device, device identifying data, function identifying data, and core part identifying data are extracted for each function of the device to be designed from configuration information indicating a configuration of functions of the device to be designed, area data corresponding to the extracted device identifying data and the extracted function identifying data is extracted from parts information representing information on parts of another device, part shape data representing a three-dimensional shape of a core part identified by the extracted core part identifying data is extracted from a set of part shape data representing three-dimensional shapes of parts, mounting surface shape data representing a shape of a surface on which the parts of the function of the device are mounted is generated on a basis of the extracted area data, and display of a model representing the three-dimensional shape of the core part and a model representing the shape of the surface on which the parts are mounted is controlled on a basis of the part shape data and the mounting surface shape data.

9 Claims, 22 Drawing Sheets

FIG.5

```xml
<modules>
<legacy_db>c:/TEMP/LDB/9101.csv</legacy_db>
    <modules name="ABC-1234">
        <block id="HOST"name="CPU">
            <unit name="XYZ-9101_CPU"/>
            <keydevice pn="987654321"quantity="1">
                <connections>
                        <connections name="HD_GTL"/>
                        <connections name="HA_GTL"/>
                </connections>
                <description>FEYCONN_PZ47903-2741-13_PM-P</description>
            </keydevice>
        </block>
        <block id="HOST"name="GMCH">
            <unit name="XYZ-9101_GMCH"/>
            <keydevice pn="987654220"quantity="1">
                <connections>
                        <connections name="HD_GTL"/>
                        <connections name="HA_GTL"/>
                        <connections name="SDQ"/>
                        <connections name="SMA"/>
                        <connections name="HUB"/>
                </connections>
                <description>QG82915PM</description>
            </keydevice>
        </block>
        <block id="VIDEO"name="VIDEO44">
            <unit name="XYZ-9101_VI44"/>
            <keydevice pn="987654100"quantity="1">
                <description>VI44M-V</description>
            </keydevice>
        </block>
        <block id="VIDEO"name="VIDEO_RAM">
            <unit name="XYZ-9101_VRAM"/>
            <keydevice pn="987654000"quantity="2">
                <description>HY5DU573222FP</description>
            </keydevice>
        </block>
        <block id="MEMORY"name="DDR_MEMORY">
            <unit name="XYZ-9101_MEMORY"/>
            <keydevice pn="987653000"quantity="2">
                <connections>
                        <connections name="SDQ"/>
                        <connections name="SMA"/>
                </connections>
                <description>FEYCONN_AS0A426-M6RP-4F</description>
```

FIG.6

```xml
        </keydevice>
</block>
<block id="ICH"name="ICH6">
        <unit name="XYZ-9101_ICH"/>
        <keydevice pn="9876520000"quantity="1">
                <connections>
                        <connections name="HUB"/>
                        </connections>
                <description>NH82801FBMSL7VM</description>
        </keydevice>
</block>
<block id="PCI"name="PCI_CTRL">
        <unit name="XYZ-9101_PCI_CTRL"/>
        <keydevice pn="9876510000"quantity="1">
                <description>PCI7420-SN0307009BZHK-1SLOT</description>
        </keydevice>
</block>
<block id="POWER"name="POWER">
        <unit name="XYZ-9101_POWER"/>
        <keydevice pn="9876400001"quantity="1">
                <description>LM27297SQX VCPUCORE</description>
        </keydevice>
        <keydevice pn="9876400002"quantity="1">
                <description>MAX1541ETL VMCHCORE and VGFXCORE</description>
        </keydevice>
        <keydevice pn="9876400003"quantity="1">
                <description>LTC3728LCUH-TR-R5 1.5VSUS and VCC_DDR2</description>
        </keydevice>
        <keydevice pn="9876400004"quantity="1">
                <description>TAR5S25U 2.5VSUS</description>
        </keydevice>
        <keydevice pn="9876400005"quantity="1">
                <description>SEMTECH_SC338AIMSTR 1.2VSUS</description>
        </keydevice>
        <keydevice pn="9876400006"quantity="2">
                <description>TPS51100DGQR VTT</description>
        </keydevice>
        <keydevice pn="9876400007"quantity="1">
                <description>LTC3728LCUH-TR-R5 3VALW and 5VALW</description>
        </keydevice>
        <keydevice pn="9876400008"quantity="1">
                <description>NIXNA_MAX4374TEUB-TG069 VPWRSRC</description>
        </keydevice>
        <keydevice pn="9876400009"quantity="1">
```

FIG.7

```xml
<description>NIXNA_MAX1908ETI+TG069 Battery Charger</description>
            </keydevice>
        </block>
        <block id="AUDIO"name="AUDIO_block">
            <unit name="XYZ-9101_AUDIO"/>
            <keydevice pn="987540001"quantity="1">
                    <description>ALC260</description>
            </keydevice>
            <keydevice pn="987540002"quantity="1">
                    <description>IC570PPPP_AN12944A</description>
            </keydevice>
        </block>
        <signal name="HD_GTL">
            <bus>64</bus>
            <maxLength>10</maxLength>
            <description>PSB BUS</description>
        </signal>
        <signal name="HA_GTL">
            <bus>32</bus>
            <description>PSB BUS</description>
        </signal>
        <signal name="SDQ">
            <bus>64</bus>
            <description>DDR333</description>
        </signal>
        <signal name="SMA">
            <bus>13</bus>
            <description>DDR333</description>
        </signal>
        <signal name="HUB">
            <bus>11</bus>
            <description>HUB interface</description>
        </signal>
    </model>
</modules>
```

FIG. 9

| ITEM NAME | Block name | Unit name | PN | AREA |
|---|---|---|---|---|
| DESCRIPTION | BLOCK NAME | UNIT NAME | PART NUMBER | DRC AREA OF PART |
| INPUT TYPE | Char | Char | Char | Float |
| UNIT | NO UNIT | NO UNIT | NO UNIT | mm2 |
| | HOST | CPU | 987654321 | 1939.9 |
| | HOST | CPU | 990000002 | 1.6 |
| | HOST | CPU | 990000001 | 5.0 |
| | HOST | CPU | 990000001 | 5.0 |
| | HOST | CPU | 990000001 | 5.0 |
| | HOST | CPU | 990000001 | 5.0 |
| | HOST | CPU | 990000003 | 1.6 |
| | HOST | CPU | 990000004 | 1.6 |
| | HOST | CPU | 990000005 | 1.6 |
| | HOST | CPU | 990000006 | 1.6 |
| | HOST | CPU | 990000007 | 1.6 |
| | HOST | GMCH | 987654220 | 1834.6 |
| | HOST | GMCH | 990000008 | 1.6 |
| | HOST | GMCH | 990000008 | 1.6 |
| | HOST | GMCH | 990000008 | 1.6 |
| | HOST | GMCH | 990000008 | 1.6 |
| | HOST | GMCH | 990000001 | 5.0 |
| | HOST | GMCH | 990000009 | 2.9 |
| | HOST | GMCH | 990000009 | 2.9 |
| | HOST | GMCH | 990000010 | 2.9 |
| | HOST | GMCH | 990000011 | 5.0 |

```
<modules>
<legacy_db>c:/TEMP/LDB/9101.csv</legacy_db>
<model name="ABC-1234">
<block id="HOST" name="CPU">
<unit name="XYZ-9101" CPU />
<keydevice pn="98765432l"quantity="1">
<connections>
<connections name="HD_GTL"/>
<connections name="HA_GTL"/>
</connections>
<description>FEYCONN_PZ47903-2741-13_PM-P</description>
</keydevice>
</block>
```

51

| ITEM NAME | Block name | Unit name | PN | AREA |
|---|---|---|---|---|
| DESCRIPTION | BLOCK NAME | UNIT NAME | PART NUMBER | MOUNTING AREA OF PART |
| INPUT TYPE | Char | Char | Char | Float |
| UNIT | NO UNIT | NO UNIT | NO UNIT | mm2 |
|  | HOST | CPU | 987654321 | 1939.9 |
|  | HOST | CPU | 990000002 | 1.6 |
|  | HOST | CPU | 990000001 | 5.0 |
|  | HOST | CPU | 990000001 | 5.0 |
|  | HOST | CPU | 990000001 | 5.0 |
|  | HOST | CPU | 990000001 | 5.0 |
|  | HOST | CPU | 990000003 | 1.6 |

52

FUNCTIONAL BLOCK
PARTS CONFIGURATION
INFORMATION OF
XYZ-9101

```
<modules>
<legacy_db>c:/TEMP/LDB/9101.csv</legacy_db>
<model name="ABC-1234">
<block id="HOST"name="CPU">
<unit name="XYZ-9101_CPU"/>
<keydevice pn="98765432l" quantity="1">
<connections>
    <connections name="HD_GTL"/>
    <connections name="HA_GTL"/>
</connections>
<description>FEYCONN_PZ47903-2741-13_PM-P</description>
</keydevice>
</block>
```

INFORMATION PROCESSING APPARATUS AND METHOD, AND PROGRAM

CROSS REFERENCES TO RELATED APPLICATIONS

The present invention contains subject matter related to Japanese Patent Application JP 2005-049414 filed in the Japanese Patent Office on Feb. 24, 2005, the entire contents of which being incorporated herein by reference.

BACKGROUND OF THE INVENTION

The present invention relates to an apparatus and a method for information processing, and a program, and particularly to an apparatus and a method for information processing, and a program that assist design of a device.

A so-called CAD (Computer-Aided Design) system that displays a model representing a shape to assist design is used in designing various objects.

A three-dimensional CAD system, in particular, that displays a model representing a three-dimensional shape to assist design is widely used in designing machines.

In a field of circuit design of electronic devices, a CAD system that displays a two-dimensional model to assist circuit design is used, and a three-dimensional CAD system has started to come into use in a part of the field.

Conventionally, a three-dimensional model preparing device in a system provided with a three-dimensional parts information retaining part for storing information of three-dimensional size of parts to be mounted on a board and preparing a three-dimensional model of the board mounted with the parts on the basis of two-dimensional electric system design information of parts and wirings mounted on the board designed by a computer is proposed (see for example, Japanese Patent Laid-Open No. Hei 11-353341, hereinafter referred to as Patent Document 1). In this three-dimensional model preparing device, the electric system design information is input, the three-dimensional parts information retaining part is searched on the basis of the electric system design information to extract parts having three-dimensional size, the extracted parts are arranged on the board, and a three-dimensional model of the board mounted with the parts is prepared.

SUMMARY OF THE INVENTION

With a two-dimensional CAD system used widely in circuit design for electronic devices, it is not possible to check visually for physical interference between electronic parts mounted on a board and mechanism parts. In addition, with the two-dimensional CAD system, the shape of the inside of a casing of an electronic device in which casing the electronic parts are housed cannot be visually checked. Therefore, it is not possible to consider changing of a position where the board is disposed with respect to the casing of the electronic device and changing of the shape of the board.

A three-dimensional CAD system applied to circuit design for the electronic device makes it possible to consider an arrangement of the electronic parts on the board, the changing of the position where the board is disposed with respect to the casing of the electronic device, and the changing of the shape of the board.

However, in circuit design for an electronic device in which a large number of electronic parts need to be arranged on one or a plurality of boards, it takes an extensive effort to create three-dimensional models of all the electronic parts.

In addition, even when the three-dimensional models of the electronic parts can be created easily, it takes an extensive effort to dispose each of the three-dimensional models of the numerous electronic parts. Further, when the three-dimensional models of the electronic parts are arranged, mutual positional relations based on signal transmission and the like need to be considered.

Thus, when a three-dimensional CAD system is simply applied to circuit design for electronic devices, much effort is required for operations, so that efficiency of consideration work is greatly decreased.

The present invention has been made in view of such a situation, and it is desirable to make it possible to consider an arrangement of parts on a board of an electronic device more easily while three-dimensional shapes are displayed.

According to an embodiment of the present invention, there is provided an information processing apparatus including: a first extractor extracting device identifying data, function identifying data, and core part identifying data for each function of a device to be designed, from configuration information indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; a second extractor extracting area data corresponding to the extracted device identifying data and the extracted function identifying data for each function of the device to be designed, from parts information representing information on parts of the other device, the parts information including the area data indicating an area necessary to mount the parts in correspondence with the device identifying data and the function identifying data; a third extractor extracting part shape data representing a three-dimensional shape of the core part identified by the extracted core part identifying data for each function of the device to be designed, from a set of part shape data representing three-dimensional shapes of parts; a generator generating, for each function of the device to be designed, mounting surface shape data representing a shape of a surface on which the parts of the function of the device are mounted on a basis of the extracted area data; and a display controller controlling display of a model representing the three-dimensional shape of the core part and a model representing the shape of the surface on which the parts are mounted on a basis of the part shape data and the mounting surface shape data.

The information processing apparatus can further include an editor editing the mounting surface shape data so as to divide the model representing the shape of the surface on which the parts are mounted.

The information processing apparatus can further include an editor editing the mounting surface shape data so as to change a shape of the model representing the shape of the surface on which the parts are mounted while maintaining an area of the surface on which the parts are mounted.

The generating section can generate the mounting surface shape data representing the shape of the surface on which of the parts of each function of the device, parts excluding the core part are mounted.

The display controlling section can control the display of the model representing the three-dimensional shape of the core part and the model representing the shape of the surface on which the parts are mounted such that the model representing the shape of the surface on which the parts are mounted is displayed adjoining the model representing the three-dimensional shape of the core part.

According to an embodiment of the present invention, there is provided an information processing method including: a first extracting step of extracting device identifying data, function identifying data, and core part identifying data for each function of a device to be designed, from configuration information indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; a second extracting step of extracting area data corresponding to the extracted device identifying data and the extracted function identifying data for each function of the device to be designed, from parts information representing information on parts of the other device, the parts information including the area data indicating an area necessary to mount the parts in correspondence with the device identifying data and the function identifying data; a third extracting step of extracting part shape data representing a three-dimensional shape of the core part identified by the extracted core part identifying data for each function of the device to be designed, from a set of part shape data representing three-dimensional shapes of parts; a generating step of generating, for each function of the device to be designed, mounting surface shape data representing a shape of a surface on which the parts of the function of the device are mounted on a basis of the extracted area data; and a display controlling step of controlling display of a model representing the three-dimensional shape of the core part and a model representing the shape of the surface on which the parts are mounted on a basis of the part shape data and the mounting surface shape data.

According to an embodiment of the present invention, there is provided a program for making a computer perform: a first extracting step of extracting device identifying data, function identifying data, and core part identifying data for each function of a device to be designed, from configuration information indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; a second extracting step of extracting area data corresponding to the extracted device identifying data and the extracted function identifying data for each function of the device to be designed, from parts information representing information on parts of the other device, the parts information including the area data indicating an area necessary to mount the parts in correspondence with the device identifying data and the function identifying data; a third extracting step of extracting part shape data representing a three-dimensional shape of the core part identified by the extracted core part identifying data for each function of the device to be designed, from a set of part shape data representing three-dimensional shapes of parts; a generating step of generating, for each function of the device to be designed, mounting surface shape data representing a shape of a surface on which the parts of the function of the device are mounted on a basis of the extracted area data; and a display controlling step of controlling display of a model representing the three-dimensional shape of the core part and a model representing the shape of the surface on which the parts are mounted on a basis of the part shape data and the mounting surface shape data.

In the information processing device and method and the program according to the embodiments of the present invention, device identifying data, function identifying data, and core part identifying data are extracted for each function of a device to be designed from configuration information indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed, area data corresponding to the extracted device identifying data and the extracted function identifying data is extracted for each function of the device to be designed from parts information representing information on parts of the other device, the parts information including the area data indicating an area necessary to mount the parts in correspondence with the device identifying data and the function identifying data, part shape data representing a three-dimensional shape of the core part identified by the extracted core part identifying data is extracted for each function of the device to be designed from a set of part shape data representing three-dimensional shapes of parts, for each function of the device to be designed, mounting surface shape data representing a shape of a surface on which the parts of the function of the device are mounted is generated on a basis of the extracted area data, and display of a model representing the three-dimensional shape of the core part and a model representing the shape of the surface on which the parts are mounted is controlled on a basis of the part shape data and the mounting surface shape data.

As described above, according to the present invention, it is possible to assist design of an electronic device.

In addition, according to the present invention, it is possible to consider an arrangement of parts on a board of an electronic device more easily while three-dimensional shape is displayed.

BRIEF DESCRIPTION OF THE DRAWINGS

FIG. 5 is a diagram showing a concrete example of the functional block index information;

FIG. 6 is a diagram showing a concrete example of the functional block index information;

FIG. 7 is a diagram showing a concrete example of the functional block index information;

FIG. 9 is a diagram showing an example of a functional block parts configuration information database;

FIG. 12 is a diagram of assistance in explaining a process of the functional block mounting area extracting unit;

DETAILED DESCRIPTION OF THE PREFERRED EMBODIMENT

A preferred embodiment of the present invention will hereinafter be described. Correspondences between elements described in claims and concrete examples in the embodiment of the invention are illustrated as follows. This description is to confirm that concrete examples supporting the invention described in the claims are described in the embodiment of the invention. Therefore, even when there is a concrete example described in the embodiment of the invention but not described here as corresponding to an element, it does not mean that the concrete example does not correspond to the element. Conversely, even when a concrete example is described here as corresponding to an element, it does not mean that the concrete example does not correspond to elements other than that element.

Further, this description does not signify that all inventions corresponding to concrete examples described in the embodiment of the invention are described in the claims. In other words, this description does not negate presence of inventions that correspond to concrete examples described in the embodiment of the invention but are not described in the claims of the present application, that is, presence of inventions to be presented by a divisional application or added by an amendment in the future.

Figure 10:
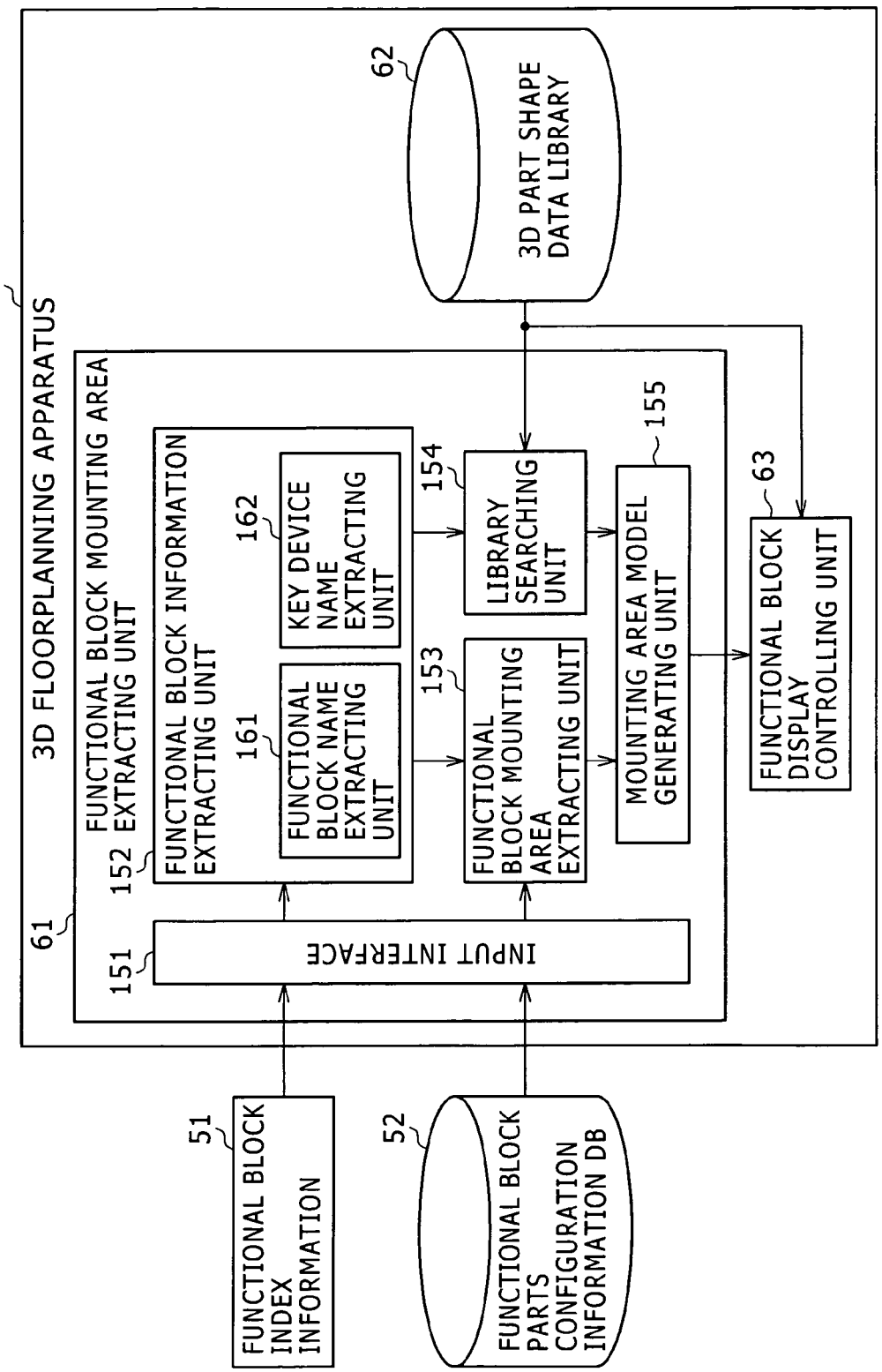
FIG. 10 is a block diagram showing a configuration of functions of a functional block mounting area extracting unit.

An information processing apparatus according to an embodiment of the present invention includes: first extracting means (for example a functional block information extracting unit 152 in FIG. 10) for extracting device identifying data (for example device identifying data included in a functional block unit name), function identifying data (for example function identifying data included in the functional block unit name), and core part identifying data (for example an intra-unit key device name) for each function of a device to be designed, from configuration information (for example functional block index information 51) indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; second extracting means (for example a functional block mounting area extracting unit 153) for extracting area data corresponding to the extracted device identifying data and the extracted function identifying data for each function of the device to be designed, from parts information (for example a functional block parts configuration information database 52) representing information on parts of the other device, the parts information including the area data indicating an area necessary to mount the parts in correspondence with the device identifying data and the function identifying data; third extracting means (for example a library searching unit 154 in FIG. 10) for extracting part shape data representing a three-dimensional shape of the core part identified by the extracted core part identifying data for each function of the device to be designed, from a set of part shape data (for example a 3D part shape data library 62) representing three-dimensional shapes of parts; generating means (for example a mounting area model generating unit 155 in FIG. 10) for generating, for each function of the device to be designed, mounting surface shape data representing a shape of a surface on which the parts of the function of the device are mounted on a basis of the extracted area data; and display controlling means (for example a functional block display controlling unit 63 in FIG. 10) for controlling display of a model representing the three-dimensional shape of the core part and a model representing the shape of the surface on which the parts are mounted on a basis of the part shape data and the mounting surface shape data.

Figure 2:
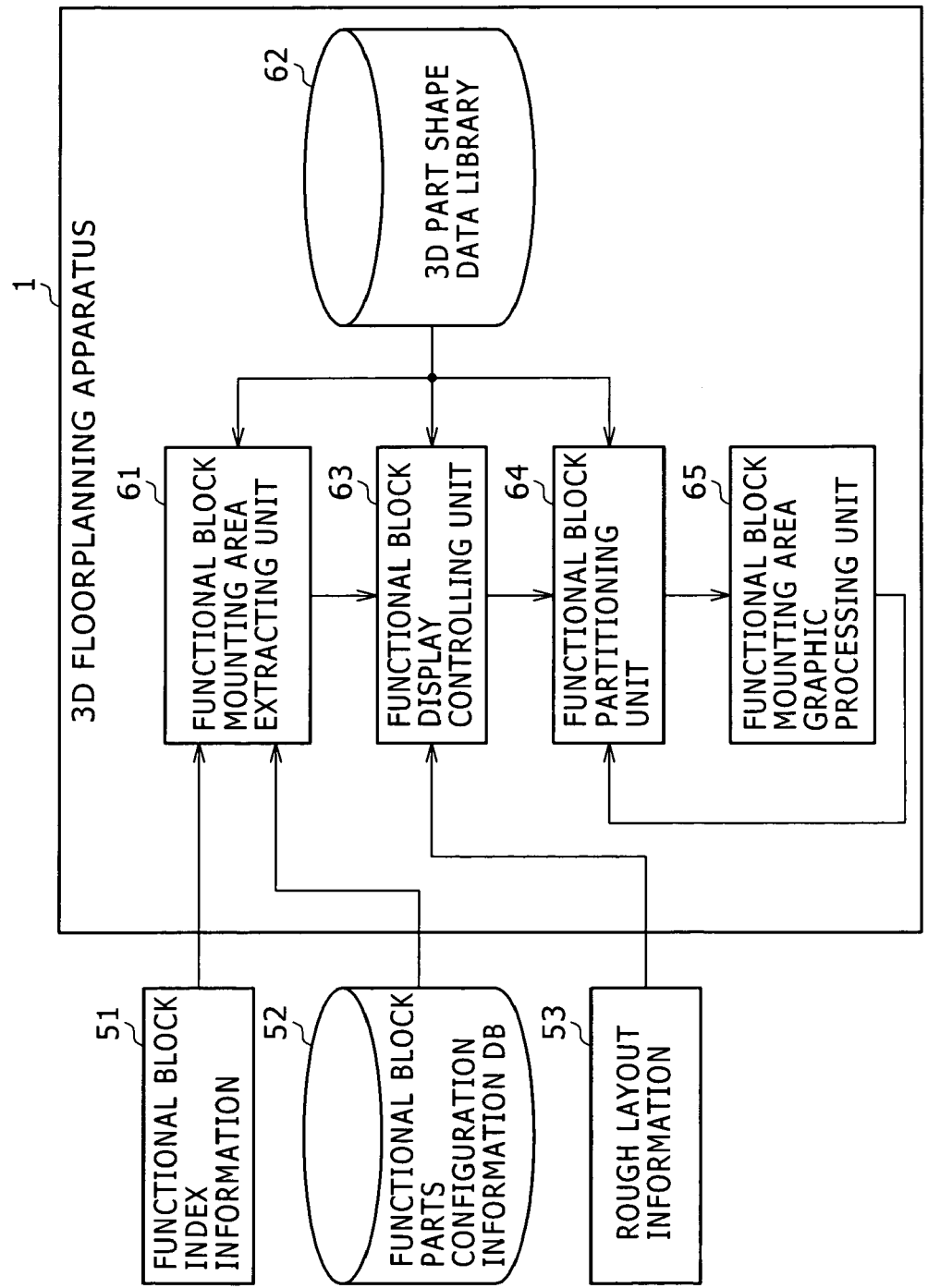
FIG. 2 is a diagram showing a configuration of functions of the 3D floorplanning apparatus.

The information processing apparatus can further include editing means (for example a functional block mounting area graphic processing unit 65 in FIG. 2) for editing the mounting surface shape data so as to divide the model representing the shape of the surface on which the parts are mounted.

The information processing apparatus can further include editing means (for example a functional block mounting area graphic processing unit 65 in FIG. 2) for editing the mounting surface shape data so as to change a shape of the model representing the shape of the surface on which the parts are mounted while maintaining an area of the surface on which the parts are mounted.

An information processing method according to an embodiment of the present invention includes: a first extracting step (a process of steps S12 to S14 in FIG. 21) of extracting device identifying data (for example device identifying data included in a functional block unit name), function identifying data (for example function identifying data included in the functional block unit name), and core part identifying data (for example an intra-unit key device name) for each function of a device to be designed, from configuration information (for example functional block index information 51) indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; a second extracting step (for example a process of step S15 in FIG. 21) of extracting area data corresponding to the extracted device identifying data and the extracted function identifying data for each function of the device to be designed, from parts information (for example a functional block parts configuration information database 52) representing information on parts of the other device, the parts information including the area data indicating an area necessary to mount the parts in correspondence with the device identifying data and the function identifying data; a third extracting step (for example a process of step S16 in FIG. 21) of extracting part shape data representing a three-dimensional shape of the core part identified by the extracted core part identifying data for each function of the device to be designed, from a set of part shape data (for example a 3D part shape data library 62) representing three-dimensional shapes of parts; a generating step (for example a process of step S18 in FIG. 21) of generating, for each function of the device to be designed, mounting surface shape data representing a shape of a surface on which the parts of the function of the device are mounted on a basis of the extracted area data; and a display controlling step (for example a process of step S19 in FIG. 21) of controlling display of a model representing the three-dimensional shape of the core part and a model representing the shape of the surface on which the parts are mounted on a basis of the part shape data and the mounting surface shape data.

A program according to an embodiment of the present invention makes a computer perform: a first extracting step (a process of steps S12 to S14 in FIG. 21) of extracting device identifying data (for example device identifying data included in a functional block unit name), function identifying data (for example function identifying data included in the functional block unit name), and core part identifying data (for example an intra-unit key device name) for each function of a device to be designed, from configuration information (for example functional block index information 51) indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed; a second extracting step (for example a process of step S15 in FIG. 21) of extracting area data corresponding to the extracted device identifying data and the extracted function identifying data for each function of the device to be designed, from parts information (for example a functional block parts configuration information database 52) representing information on parts of the other device, the parts information including the area data indicating an area necessary to mount the parts in correspondence with the device identifying data and the function identifying data; a third extracting step (for example a process of step S16 in FIG. 21) of extracting part shape data representing a three-dimensional shape of the core part identified by the extracted core part identifying data for each function of the device to be designed, from a set of part shape data (for example a 3D part shape data library 62) representing three-dimensional shapes of parts; a generating step (for example a process of step S18 in FIG. 21) of generating, for each function of the device to be designed, mounting surface shape data representing a shape of a surface on which the parts of the function of the device are mounted on a basis of the extracted area data; and a display controlling step (for example a process of step S19 in FIG. 21) of controlling display of a model representing the three-dimensional shape of the core part and a model representing the shape of the surface on which the parts are mounted on a basis of the part shape data and the mounting surface shape data.

A 3D floorplanning apparatus according to an embodiment of the present invention is implemented by an engineering workstation, a personal computer, or a special apparatus that executes a 3D floorplanning program.

Figure 1:
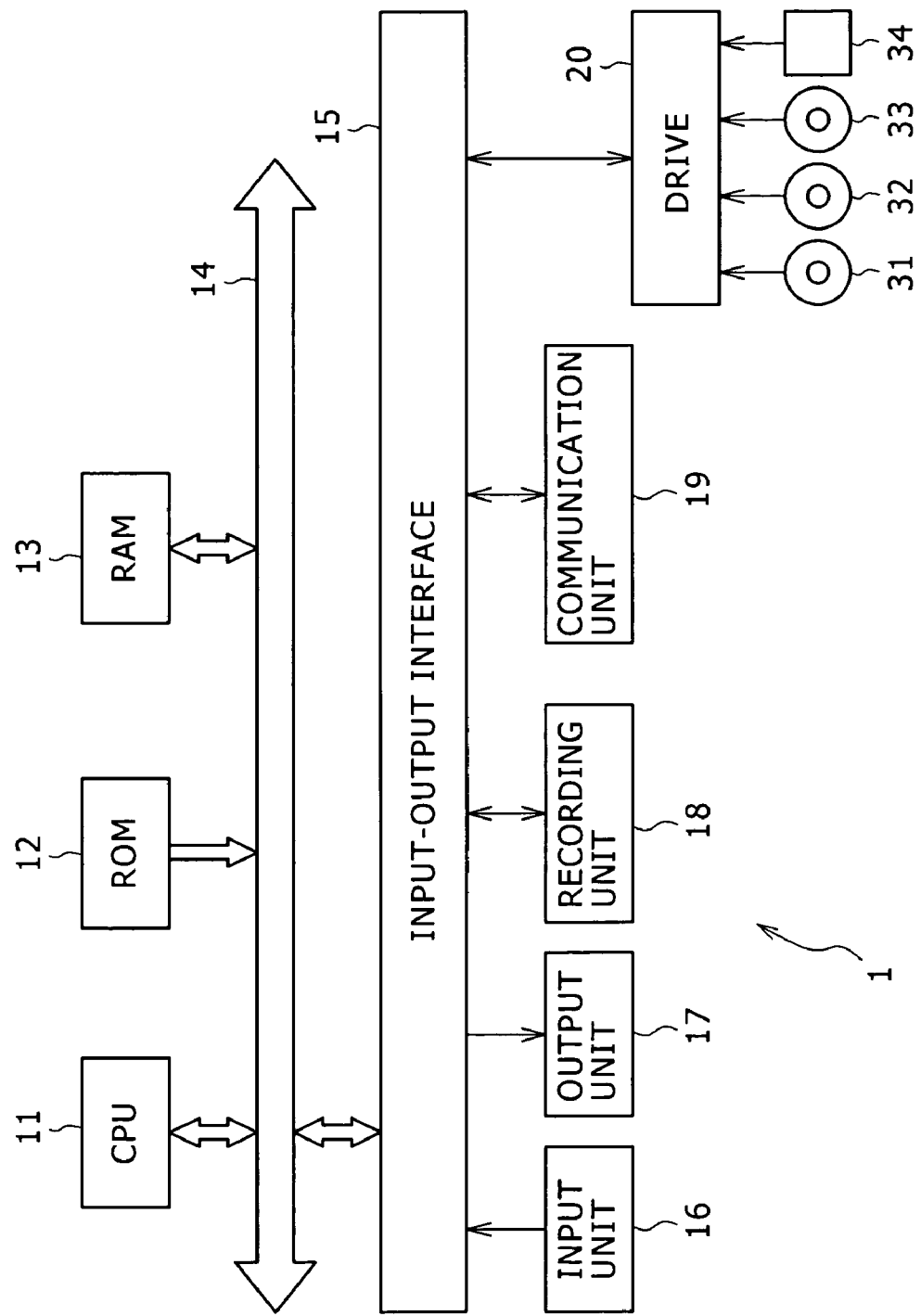
FIG. 1 is a block diagram showing an example of configuration of an embodiment of a 3D floorplanning apparatus according to the present invention.

FIG. 1 is a block diagram showing an example of configuration of an embodiment of a 3D floorplanning apparatus 1 according to the present invention. A CPU (Central Processing Unit) 11 performs various processes according to a program recorded in a ROM (Read Only Memory) 12, a RAM (Random Access Memory) 13, or a recording unit 18. The ROM 12 stores a program executed by the CPU 11 or fixed data. The RAM 13 stores a program executed by the CPU 11, data having a value changed as the program is executed, and the like as required. The CPU 11, the ROM 12, and the RAM 13 are interconnected by a bus 14.

The CPU 11 is also connected with an input-output interface 15 via the bus 14. The input-output interface 15 is connected with an input unit 16 formed by a keyboard, a mouse, a digitizer and the like, and an output unit 17 formed by a display, a speaker, a lamp and the like. The CPU 11 performs various processes in response to a command input from the input unit 16.

A recording unit 18 connected to the input-output interface 15 is formed by a hard disk, for example. The recording unit 18 records programs executed by the CPU 11 and various data. A communication unit 19 communicates with an external device via a communication network such as the Internet and other networks.

Also, a program may be obtained via the communication unit 19 to be recorded in the recording unit 18.

A drive 20 connected to the input-output interface 15 drives a magnetic disk 31, an optical disk 32, a magneto-optical disk 33, a semiconductor memory 34 and the like to obtain a program, data or the like recorded on these media when the media are loaded into the drive 20. The program or the data obtained is transferred to the recording unit 18 to be recorded therein as required.

FIG. 2 is a diagram showing a configuration of functions of the 3D floorplanning apparatus 1 implemented by executing a 3D floorplanning program. Functional block index information 51 represents a configuration of functions of a device to be designed. As will be described later, the functional block index information 51 includes a functional block unit name as data including device identifying data as information identifying another device already designed and function identifying data as information identifying a function of the other device, the function of the other device corresponding to a function of the device to be designed. The functional block index information 51 also includes an intra-unit key device name indicating a part number of a core part as a core of the function of the device to be designed.

The function of the device to be designed refers to for example an operation function, a memory management function, a memory, a display controlling function, or a power supply, which is a section providing one operation or a series of operations, and is a section for constructing the device, the part being formed by a plurality of parts. Parts constituting one function of the device to be designed need to supply voltage, current and the like to each other and satisfy specific positional relations with each other, and can thus be generally said to be strongly coupled to each other electrically.

The device to be designed may be an electric device or an electronic device formed by electric parts or electronic parts.

The functional block index information 51 further includes a functional block name representing the name of a block as a set of one or a plurality of functions. The functional block index information 51 for example has a functional block unit name and an intra-unit key device name stored for each functional block.

A functional block parts configuration information database 52 is constructed in a computer not shown in the figure. The functional block parts configuration information database 52 stores information on parts constituting the functions of a device already designed. The functional block parts configuration information database 52 supplies the stored information on the parts to the 3D floorplanning apparatus 1 via a communication line on a network or the like in response to a request from the 3D floorplanning apparatus 1.

For example, the functional block parts configuration information database 52 stores, for each device already designed, a block name representing the name of a block as a set of one or a plurality of functions of the already designed device, a unit name representing the name of a function of the already designed device, and part numbers identifying parts constituting the function of the already designed device in correspondence with information identifying the already designed device. The functional block parts configuration information database 52 also stores area data indicating an area on a board which area is necessary to mount a part identified by a part number in correspondence with the part number.

Details of the information stored in the functional block parts configuration information database 52 will be described later.

Rough layout information 53 indicates physical restrictions on arrangements on the board of the device to be designed. Specifically, the rough layout information 53 for example includes shape data representing the three-dimensional shapes of a casing of the device to be designed, specifically the inside of the casing, and the board of the device.

The 3D floorplanning apparatus 1 is supplied with the functional block index information 51 and the rough layout information 53. The 3D floorplanning apparatus 1 displays a part model for each function of the device on the display of the output unit 17 on the basis of the functional block index information 51 and the rough layout information 53 as well as the information stored in the functional block parts configuration information database 52. The model displayed on the display of the output unit 17 is an image representing a shape.

A functional block mounting area extracting unit 61, a 3D part shape data library 62, a functional block display controlling unit 63, a functional block partitioning unit 64, and a functional block mounting area graphic processing unit 65 are implemented in the 3D floorplanning apparatus 1 by executing a 3D floorplanning program.

The functional block mounting area extracting unit 61 extracts a functional block unit name as data including device identifying data and function identifying data and an intra-unit key device name for each functional block name from the supplied functional block index information 51. The functional block mounting area extracting unit 61 extracts, for each function of the device to be designed, area data indicating an area on a board which area is necessary to arrange parts constituting the function from the functional block parts configuration information database 52.

The 3D part shape data library 62 stores shape data representing the three-dimensional shapes of parts in correspondence with part numbers.

The functional block mounting area extracting unit 61 retrieves, for each function of the device to be designed, shape data representing the three-dimensional shape of a core part serving as a core of the function identified by the functional block name, that is, a so-called key device from the 3D part shape data library 62. On the basis of area data indicating an area necessary to arrange parts constituting the function identified by the functional block name, for each function of the device to be designed, the functional block mounting area extracting unit 61 generates mounting surface shape data representing the shape of a surface on which the parts are mounted. The mounting surface shape data represents the shape of the surface having the area necessary to arrange the parts constituting the function. The mounting surface shape data may be two-dimensional data, or three-dimensional data with an element on one coordinate axis zero.

The functional block display controlling unit 63 controls display of a model representing the three-dimensional shape of the key device on the display of the output unit 17 on the basis of the shape data, and controls display of a model representing the two-dimensional shape of the surface on which the parts are mounted on the display of the output unit 17 on the basis of the mounting surface shape data. The model representing the two-dimensional shape of the surface on which the parts are mounted may be a two-dimensional model, or a three-dimensional model with a size in the direction of one coordinate axis zero.

The functional block partitioning unit 64 arranges the model representing the three-dimensional shape of the key device and the model representing the two-dimensional shape of the surface on which the parts are mounted in relation to a three-dimensional model representing the shape of the board and a three-dimensional model representing the shape of the casing in response to a signal from the input unit 16 which signal corresponds to an operation by a user. The functional block partitioning unit 64 makes the functional block display controlling unit 63 display, on the output unit 17 as a display, the model representing the three-dimensional shape of the key device and the model representing the two-dimensional shape of the surface on which the parts are mounted which models are arranged in relation to the three-dimensional model representing the shape of the board and the three-dimensional model representing the shape of the casing together with the models of the board and the casing.

The functional block mounting area graphic processing unit 65 edits the mounting surface shape data so as to change the shape of the model representing the two-dimensional shape of the surface on which the parts are mounted. For example, in response to a signal from the input unit 16 which signal corresponds to an operation by the user, the functional block mounting area graphic processing unit 65 edits the mounting surface shape data so as to divide the model representing the shape of the surface on which the parts are mounted. In addition, for example, in response to a signal from the input unit 16 which signal corresponds to an operation by the user, the functional block mounting area graphic processing unit 65 edits the mounting surface shape data so as to change the shape of the model representing the shape of the surface on which the parts are mounted while maintaining the area of the surface on which the parts are mounted.

The functional block mounting area graphic processing unit 65 supplies the edited mounting surface shape data to the functional block partitioning unit 64. In response to a signal from the input unit 16 which signal corresponds to an operation by the user, the functional block partitioning unit 64 disposes the model representing the two-dimensional shape of the surface on which the parts are mounted which model corresponds to the edited mounting surface shape data in relation to the three-dimensional model representing the shape of the board and the three-dimensional model representing the shape of the casing.

Incidentally, the functional block parts configuration information database 52 may be constructed within the 3D floorplanning apparatus 1. In addition, the 3D floorplanning apparatus 1 may generate functional block index information 51 in response to an operation by the user.

Figure 3:
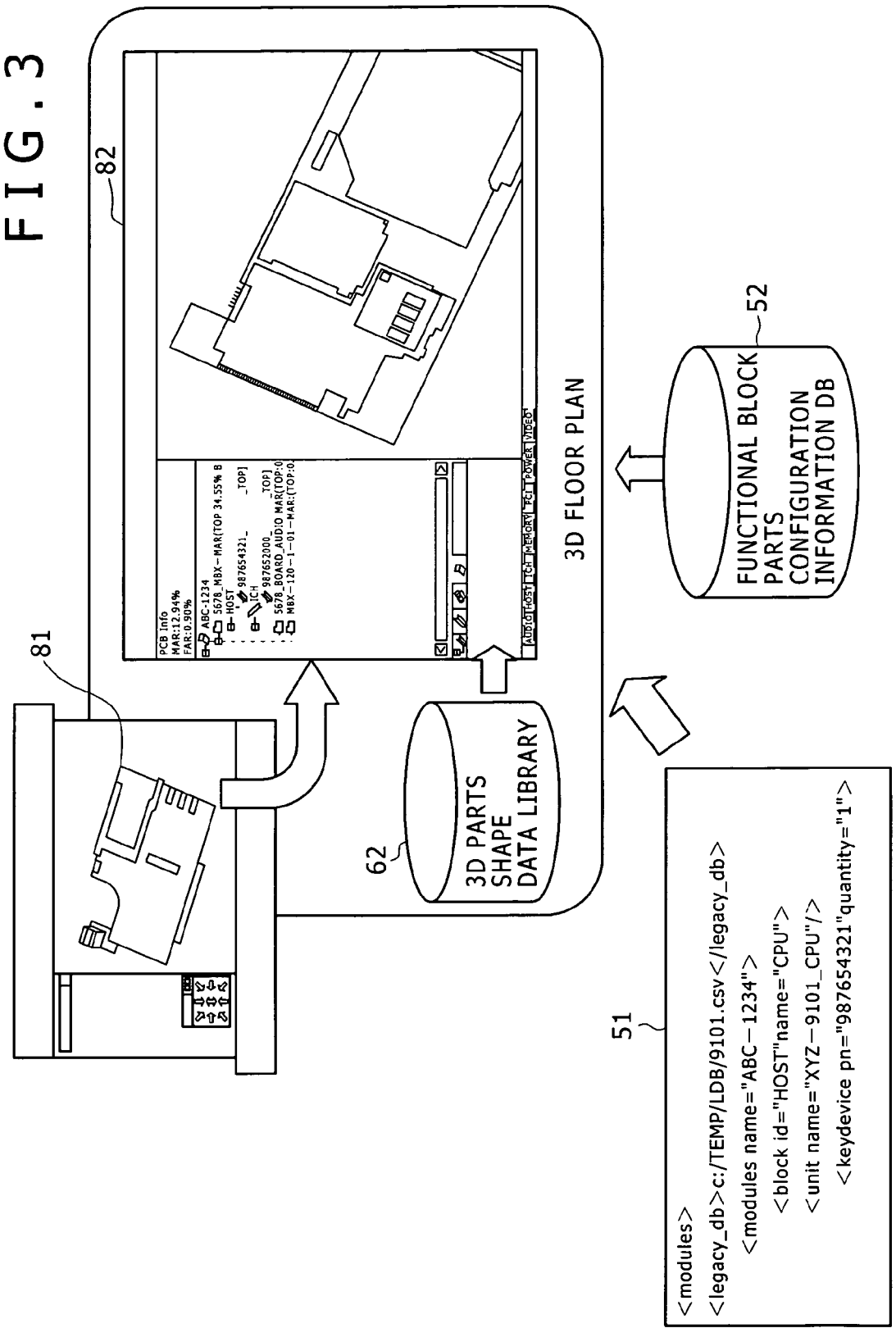
FIG. 3 is a diagram representing an outline of a 3D floorplanning process.

FIG. 3 is a diagram representing an outline of a 3D floorplanning process by the 3D floorplanning apparatus 1. For each function to be designed, the 3D floorplanning apparatus 1 obtains an area of a surface on which parts are mounted and identifies a key device from the functional block index information 51 and the functional block parts configuration information database 52. The 3D floorplanning apparatus 1 obtains shape data representing the shape of the key device from the 3D part shape data library 62. In addition, the 3D floorplanning apparatus 1 generates mounting surface shape data for displaying a two-dimensional model of the surface on which the parts are mounted from the area of the surface on which the parts are mounted.

The 3D floorplanning apparatus 1 displays a board model as a three-dimensional model representing the three-dimensional shape of a board and a casing model as a three-dimensional model representing the three-dimensional shape of a casing on the basis of the rough layout information 53. The 3D floorplanning apparatus 1 then disposes a key device model as a three-dimensional model representing the three-dimensional shape of the key device on the basis of the shape data representing the shape of the key device and a mounting surface model as the two-dimensional model representing the shape of the surface on which the parts are mounted on the basis of the mounting surface shape data in relation to the board model and the casing model. The 3D floorplanning apparatus 1 displays the key device model and the mounting surface model together with the board model and the casing model.

Figure 4:
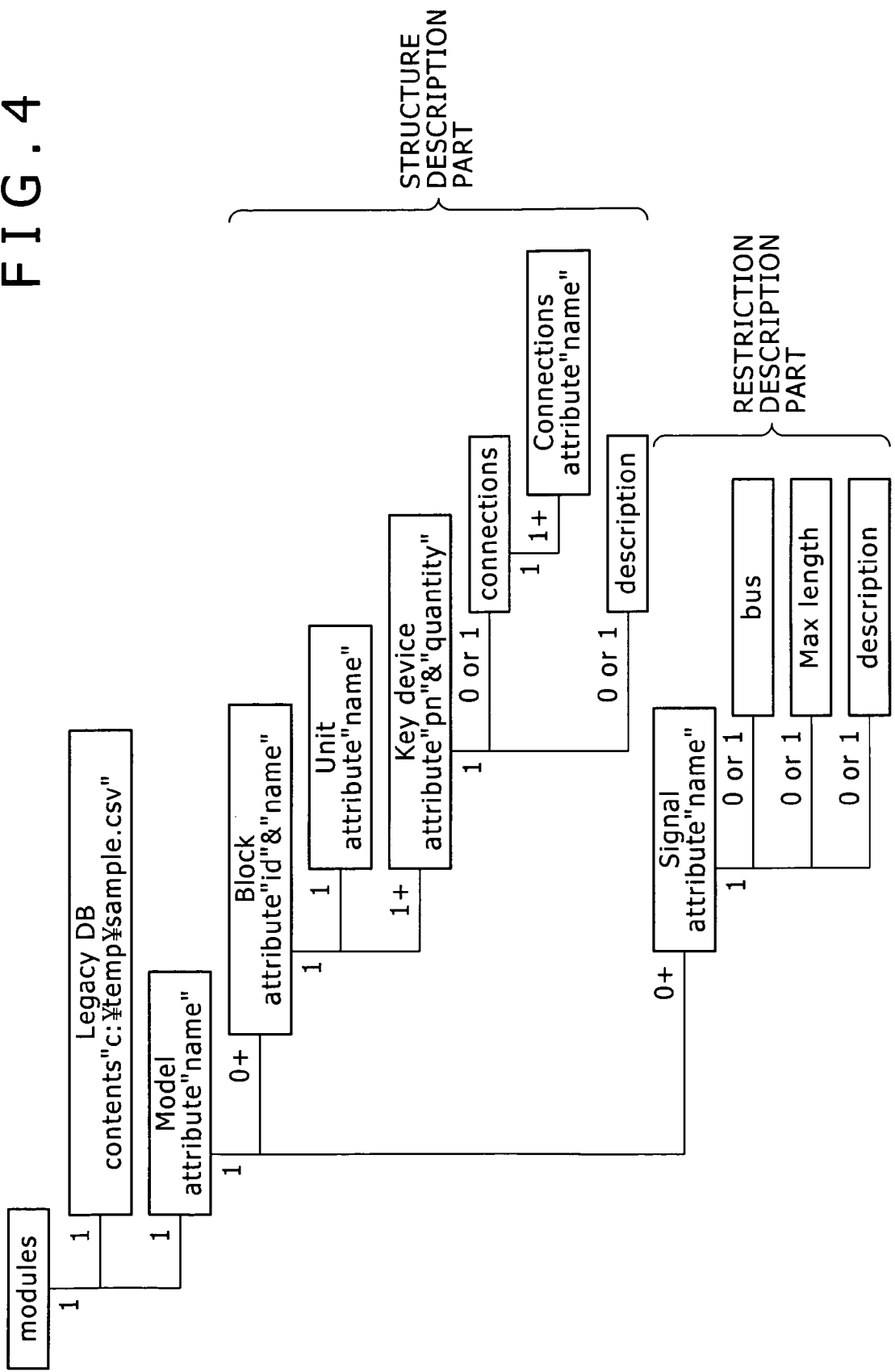
FIG. 4 is a diagram of assistance in explaining the structure of functional block index information.

FIG. 4 is a diagram of assistance in explaining the structure of the functional block index information 51. A module description part indicates the functional block index information 51, represented by "modules" in FIG. 4. The module description part corresponds to the whole of the device.

Arranged under the module description part are a database description part for identifying the functional block parts configuration information database 52, which part is represented by "Legacy DB" in FIG. 4, and a model description part for describing the name of the device, which part is represented by "Model" in FIG. 4. One database description part and one model description part are arranged under the module description part. A database description part described as "contents"c:¥temp¥sample.csv"" indicates that the functional block parts configuration information database 52 is disposed as "c:¥temp¥sample.csv". The database description part indicates the path and file name of the functional block parts configuration information database 52. A part "name" of "attribute"name"" in the model description part indicates the name (so-called model name) of the device.

A structure description part describing the structure of a function and a restriction description part describing a connection for a signal of a function are arranged under the model description part. A connection for a signal of a function restricts an arrangement of the function, and can therefore be said to be a condition that restricts the arrangement of the function.

Block description parts each describing one block which parts are represented by "Block" in FIG. 4 are arranged in the structure description part. A block is a set of one or a plurality of functions. Zero or more block description parts are arranged in the structure description part. A part "id" of "attribute"id"&"name"" in the block description part indicates a functional block name indicating the name of the block. A part "name" of "attribute"id"&"name"" in the block description part indicates a name on the display which name is to be identified by the user.

Arranged under each of the block description parts each describing one block are a unit description part describing one function, which part is represented by "Unit" in FIG. 4 and a key device description part describing a core part as a core of the function described by the unit description part, the key device description part being represented by "Key device" in FIG. 4. One unit description part and one or more key device description parts are arranged under the block description part. A part "name" of "attribute"name"" in the unit description part indicates a functional block unit name.

A part "pn" of "attribute"pn" &"quantity"" in the key device description part indicates an intra-unit key device name. A part "quantity" of "attribute"pn" &"quantity"" in the key device description part indicates the number of core parts provided for the function described by the unit description part.

Under the key device description part, a signal description part describing signals of the function is disposed, the signal description part being represented by "connections" in FIG. 4, and a description part for describing a core part is disposed, the description part being represented by "description" in FIG. 4. Zero or one signal description part and zero or one description part are arranged under the key device description part.

A signal system description part describing the systems of the individual signals of the function, which part is represented by "Connection" in FIG. 4 is disposed under the signal description part. One or more signal name description parts are disposed under the signal description part. A part "name" of "attribute"name"" in the signal name description part indicates the name of a signal described in the restriction description part.

Signal description parts each representing one signal, which parts are represented by "Signal" in FIG. 4, are arranged in the restriction description part. Zero or more signal description parts are arranged in the restriction description part. Arranged under the signal description part are zero or one bus description part, zero or one longest path length description part, and zero or one description part.

FIGS. 5 to 7 are diagrams showing a concrete example of the functional block index information 51. A database description part in the concrete example shown in FIGS. 5 to 7 shows that the functional block parts configuration information database 52 is disposed as "c:/TEM/LDB/9101.csv".

A part "model name="ABC-1234"" of a model description part indicates the name (so-called model name) of a device ABC-1234. A part "id="HOST" name="CPU"" of a block description part next to the model description part indicates a functional block name HOST and a name CPU on the display.

A part "unit name="XYZ-9101_CPU"" in a unit description part under the block description part described as "id="HOST" name="CPU"" indicates a functional block unit name XYZ-9101_CPU. The functional block unit name XYZ-9101_CPU includes device identifying data as XYZ-9101 and function identifying data as CPU. The device identifying data identifies another device already designed. The function identifying data identifies a function of the other device which function corresponds to a function of the device to be designed.

The device identifying data identifying another device already designed and the function identifying data identifying a function of the other device which function corresponds to a function of the device to be designed in the functional block unit name are divided from each other by a specific symbol or the like. For example, the device identifying data identifying another device already designed and the function identifying data identifying a function of the other device in the functional block unit name are divided from each other by "_".

A part "pn="987654321" quantity="1"" in a key device description part under the unit description part indicating the functional block unit name XYZ-9101_CPU indicates an intra-unit key device name 987654321 and the number of core parts which number is one.

Two signal system description parts are arranged under a signal name description part under the key device description part. A part "name="HD_GTL"" in the upper signal system description part indicates that a signal system for connecting the core part identified by the intra-unit key device name 987654321 is HD_GTL. A part "name="HA_GTL"" in the lower signal system description part indicates that a signal system for connecting the core part identified by the intra-unit key device name 987654321 is HA_GTL.

A part "id="HOST" name="GMCH"" of a second block description part indicates a functional block name HOST and a name GMCH on the display.

A part "unit name="XYZ-9101_GMCH"" in a unit description part under the block description part described as "id="HOST" name="GMCH"" indicates a functional block unit name XYZ-9101_GMCH. The functional block unit name XYZ-9101_GMCH includes device identifying data as XYZ-9101 and function identifying data as GMCH.

A part "pn="987654220" quantity="1"" in a key device description part under the unit description part indicating the functional block unit name XYZ-9101_GMCH indicates an intra-unit key device name 987654220 and the number of core parts which number is one.

Five signal system description parts are arranged under a signal name description part under the key device description part. A part "name="HD_GTL"" in the first signal system description part from the top indicates that a signal system for connecting the core part identified by the intra-unit key device name 987654220 is HD_GTL. A part "name="HA_GTL"" in the second signal system description part from the top indicates that a signal system for connecting the core part identified by the intra-unit key device name 987654220 is HA_GTL. A part "name="SDQ"" in the third signal system description part from the top indicates that a signal system for connecting the core part identified by the intra-unit key device name 987654220 is SDQ. A part "name="SMA"" in the fourth signal system description part from the top indicates that a signal system for connecting the core part identified by the intra-unit key device name 987654220 is SMA. A part "name="HUB"" in the fifth signal system description part from the top indicates that a signal system for connecting the core part identified by the intra-unit key device name 987654220 is HUB.

A part "id="VIDEO" name="VIDEO"" of a third block description part indicates a functional block name VIDEO and a name VIDEO on the display.

A part "unit name="XYZ-9101_NV44"" in a unit description part under the block description part described as "id="VIDEO" name="VIDEO"" indicates a functional block unit name XYZ-9101_NV44. The functional block unit name XYZ-9101_NV44 includes device identifying data as XYZ-9101 identifying the other device already designed and function identifying data as NV44 identifying a function of the other device which function corresponds to a function of the device to be designed.

A part "pn="987654100" quantity="1"" in a key device description part under the unit description part indicating the functional block unit name XYZ-9101_NV44 indicates an intra-unit key device name 987654100 and the number of core parts which number is one.

Similar subsequent block description parts are arranged: a fourth block description part described as "id="VIDEO" name="VIDEO_RAM"", a fifth block description part described as "id="MEMORY" name="DDR_MEMORY"", a sixth block description part described as "id="ICH" name="ICH6"", a seventh block description part described as "id="PCI" name="PCI_CTRL"", an eighth block description part described as "id="POWER" name="POWER"", and a ninth block description part described as "id="AUDIO" name="AUDIO_block"".

In a restriction description part, a bus description part, a longest path length description part, and a description part for each of an HD_GTL signal, an HA_GTL signal, an SDQ signal, an SMA signal, and a HUB signal are arranged. For example, bus description parts indicate the number of connections for respective signals, longest path length description parts indicate the allowable longest distance of a signal path, and description parts describe a signal system.

Figure 8:
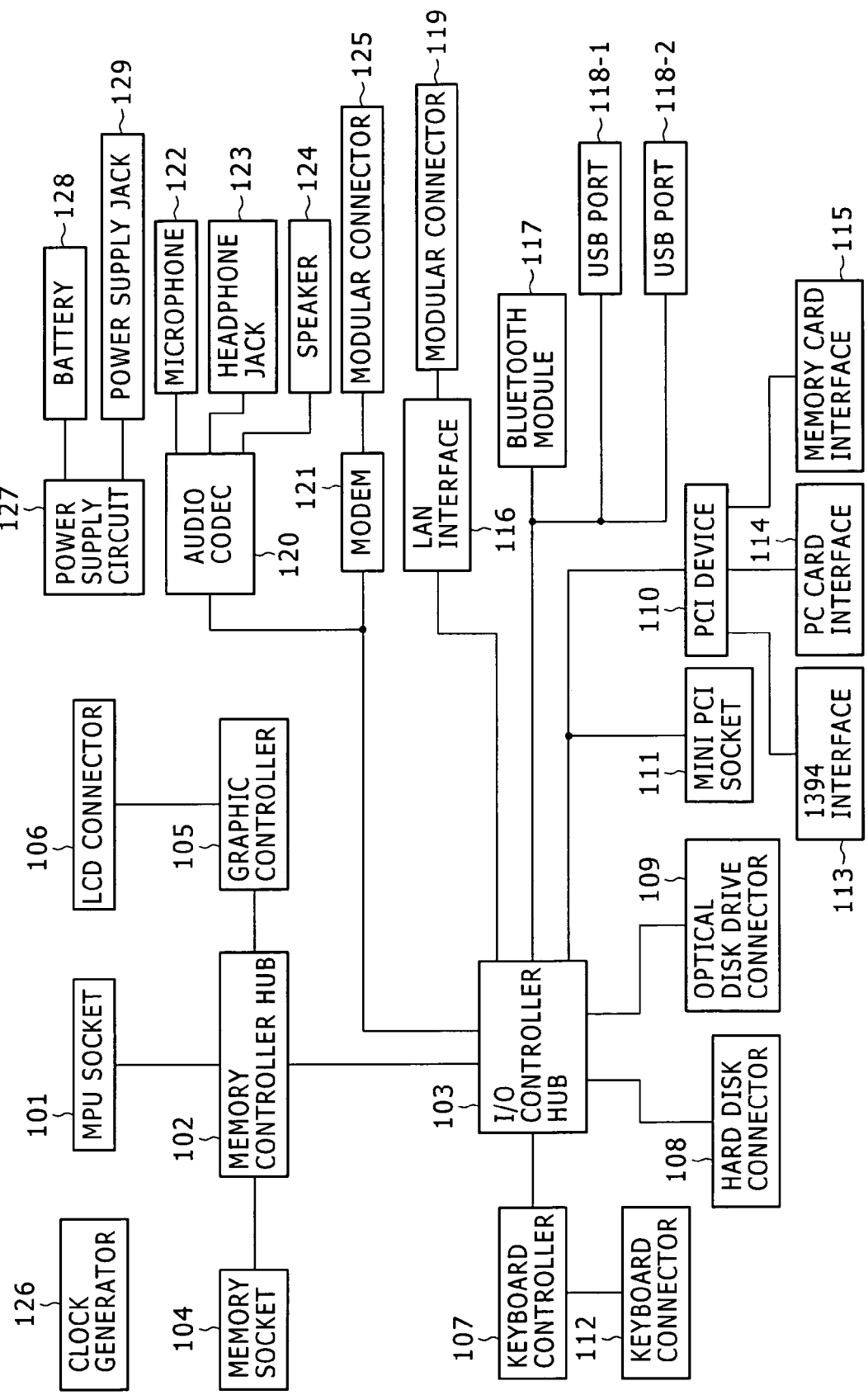
FIG. 8 is a block diagram showing an example of configuration of functions of a device to be designed.

FIG. 8 is a block diagram showing an example of configuration of functions of a device to be designed. A CPU or an MPU (Micro Processing Unit) is inserted into an MPU socket 101. A memory controller hub 102 connects the CPU or the MPU inserted into the MPU socket 101, a memory such as a RAM or the like inserted into a memory socket 104, a graphic controller 105, and an I/O controller hub 103 to each other. The memory controller hub 102 controls reading and writing of the memory inserted in the memory socket 104, and controls the graphic controller 105.

Under control of the memory controller hub 102, the graphic controller 105 controls display of an LCD (Liquid Crystal Display) connected to an LDC connector 106.

The I/O controller hub 103 controls reading of data from and writing of data to a keyboard controller 107, a hard disk connected to a hard disk connector 108, an optical disk drive connected to an optical disk drive connector 109, a PCI (Peripheral Component Interconnect) device controller 110, or a device connected to a PCI mini socket 111.

The keyboard controller 107 controls a keyboard connected to a keyboard connector 112. The PCI device controller 110 controls a connected PCI device, and controls a 1394 interface 133 complying with an IEEE (Institute of Electrical and Electronics Engineers) 1394 standard, a PC card interface 114, and a memory card interface 115.

The I/O controller hub 103 further controls a LAN (Local Area Network) interface 116, a Bluetooth module 117, and USB ports 118-1 and 118-2. The LAN interface 116 communicates with a network via a cable connected to a modular connector 119.

The I/O controller hub 103 further controls an audio codec unit 120 and a modem 121. The audio codec unit 120 encodes or decodes audio data. The audio codec unit 120 obtains an audio signal from a microphone 122, and outputs an audio signal to a headphone jack 123 or a speaker 124. The modem 121 communicates with another device via a telephone line connected to a modular connector 125.

A clock generator 126 generates a clock signal as a reference for operation, and supplies the clock signal to each part. A power supply circuit 127 obtains power from a battery 128 or a power supply jack 129, and supplies each part with power having a necessary voltage.

The block description part described as "id="HOST" name="CPU"" in the example of the functional block index information 51 shown in FIGS. 5 to 7 describes a functional block formed by the MPU socket 101 in FIG. 8, for example. The block description part described as "id="HOST" name="GMCH"" describes the memory controller hub 102 in FIG. 8, for example.

The block description part described as "id="VIDEO" name="VIDEO"" describes the graphic controller 105 in FIG. 8, for example.

The block description part described as "id="MEMORY" name="DDR_MEMORY"" describes the memory socket 104 in FIG. 8, for example. The block description part described as "id="ICH" name="ICH6"" describes the I/O controller hub 103 in FIG. 8, for example. The block description part described as "id="PCI" name="PCI_CTRL"" describes the PCI device controller 110 in FIG. 8, for example. The block description part described as "id="POWER" name="POWER"" describes the power supply circuit 127 in FIG. 8, for example. The block description part described as "id="AUDIO" name="AUDIO_block"" describes the audio codec unit 120 in FIG. 8, for example.

Thus, the functions constituting the device, which functions are each a section providing one operation or a series of operations and is formed by a plurality of parts, are described in the functional block index information 51.

FIG. 9 is a diagram showing an example of the functional block parts configuration information database 52. The functional block parts configuration information database 52 stores, for each device already designed, information on parts used in the device.

The device already designed may be a device as a sold product, or a device created to verify operation. However, it is desirable that the operation be already verified.

The information on parts which information is stored in the functional block parts configuration information database 52 includes for example a block name representing the name of a block of the device using the parts, a unit name representing the name of a function of the device using the parts, the part number of a part, and area data indicating an area on a board which area is necessary to mount the part identified by the part number.

The block name, the unit name, and the part number are stored as data in a character format. The area data is stored as data in a floating-point format in square millimeters.

The area data may indicate an area itself obtained by projecting the shape of the part on the board, or may indicate an area with consideration given to necessary wiring on the board.

For example, a block name "HOST", a unit name "CPU", a part number "987654321", and area data "1939.9" are stored in association with each other. This indicates that an area on a board which area is necessary to mount a part identified by the part number "987654321" used for a function having the name "CPU" in a block having the name "HOST" in the device is 1939.9 square millimeters. Similarly, the block name "HOST", the unit name "CPU", a part number "990000002", and area data "1.6" are stored in association with each other. This indicates that an area on a board which area is necessary to mount a part identified by the part number "990000002" used for the function having the name "CPU" in the block having the name "HOST" in the device is 1.6 square millimeters.

Part numbers "990000001" to "990000007" are stored in association with the block name "HOST" and the unit name "CPU". This indicates that parts identified by the part numbers "990000001" to "990000007" are used for the function having the name "CPU" in the block having the name "HOST" in the device. The part numbers "990000001" to "990000007" are each associated with area data "1.61" or "5.0".

Part numbers "9987654220" to "990000011" are stored in association with the block name "HOST" and a unit name "GMCH". This indicates that parts identified by the part numbers "9987654220" to "990000011" are used for the function having the name "GMCH" in the block having the name "HOST" in the device. The part numbers "9987654220" to "990000011" are each associated with area data "1834.6", "1.6", "2.9", or "5.0".

Thus, a block name representing the name of a block of the device using a part and a unit name representing the name of a function of the device using the part are stored in correspondence with a part number in the functional block parts configuration information database 52. Therefore the function for which the part identified by the part number is used can be recognized. In addition, area data indicating an area necessary to mount a part on a board is stored in association with a part number in the functional block parts configuration information database 52. Therefore the area necessary to mount the part can be determined.

That is, when a block name and a unit name are identified, an area necessary to mount parts used for a function of the already designed device can be determined.

The functions of the functional block mounting area extracting unit 61 will next be described in more detail.

FIG. 10 is a block diagram showing a configuration of the functions of the functional block mounting area extracting unit 61. The functional block mounting area extracting unit 61 includes an input interface 151, a functional block information extracting unit 152, a functional block mounting area extracting unit 153, a library searching unit 154, and a mounting area model generating unit 155.

The functional block mounting area extracting unit 61 obtains the functional block index information 51 and obtains various information stored in the functional block parts configuration information database 52 via the input interface 151. The functional block index information 51 obtained via the input interface 151 is supplied to the functional block information extracting unit 152. The various information stored in the functional block parts configuration information database 52 which information is obtained via the input interface 151 is supplied to the functional block mounting area extracting unit 153.

The functional block information extracting unit 152 extracts a functional block name, a functional block unit name, and an intra-unit key device name from the functional block index information 51. The functional block information extracting unit 152 includes a functional block name extracting unit 161 and a key device name extracting unit 162.

The functional block name extracting unit 161 in the functional block information extracting unit 152 extracts a functional block name representing the name of a block from the functional block index information 51. The functional block name extracting unit 161 in the functional block information extracting unit 152 also extracts a functional block unit name disposed in correspondence with each functional block name from the functional block index information 51.

As described above, a functional block name represents the name of a block as a set of one or a plurality of functions. A functional block unit name includes device identifying data identifying another device already designed and function identifying data identifying a function of the other device which function corresponds to a function of the device to be designed.

The functional block name extracting unit 161 may further extract device identifying data and function identifying data from the functional block unit name.

The key device name extracting unit 162 in the functional block information extracting unit 152 extracts an intra-unit key device name disposed in correspondence with each functional block name from the functional block index information 51. The intra-unit key device name represents the part number of a core part as a core of a function.

Figure 11:
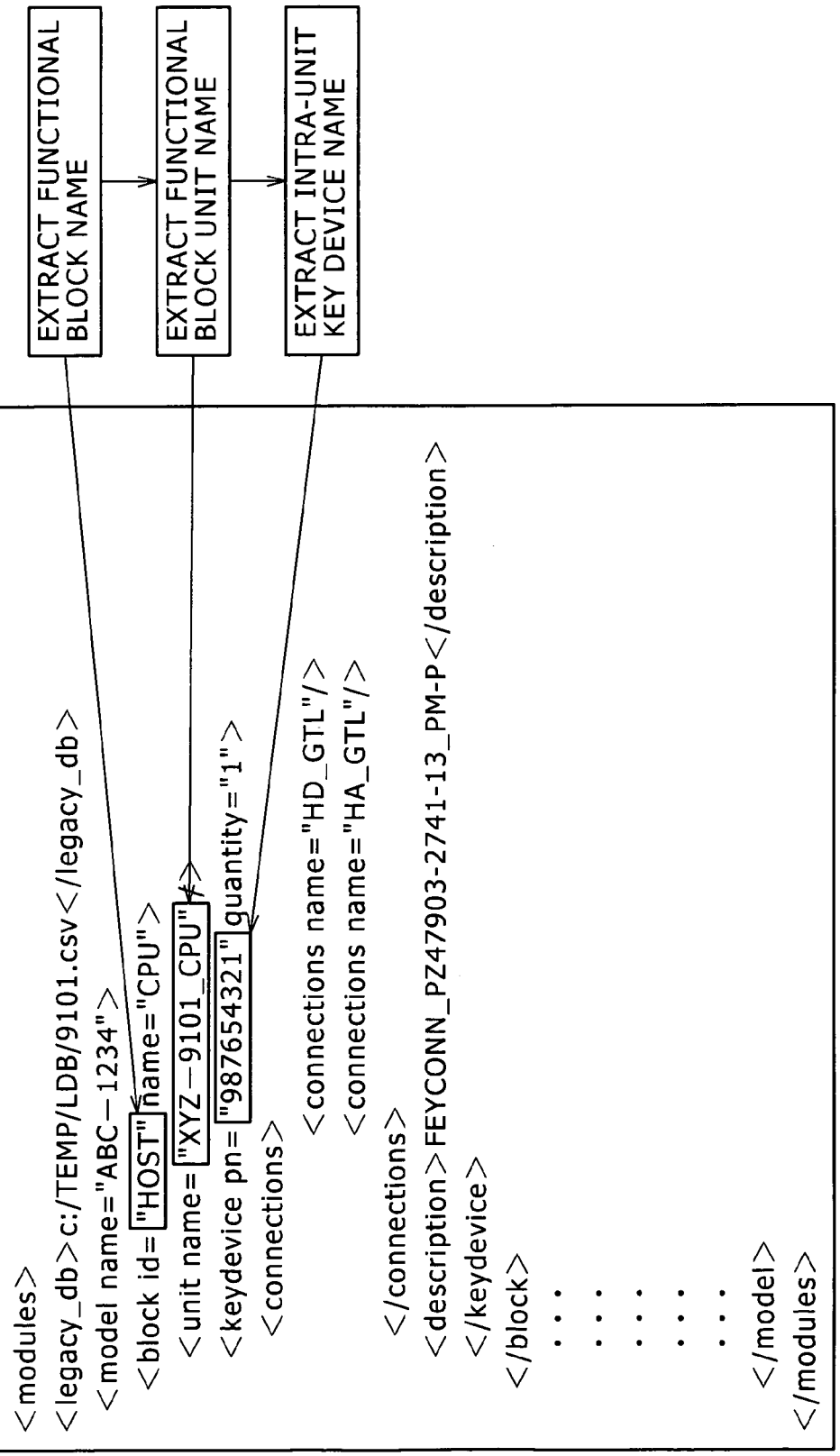
FIG. 11 is a diagram of assistance in explaining a process of the functional block mounting area extracting unit.

For example, as shown in FIG. 11, the functional block name extracting unit 161 extracts the functional block name HOST from the block description part described as "id="HOST" name="CPU"" in the functional block index information 51. Then, the functional block name extracting unit 161 extracts the functional block unit name XYZ-9101_CPU from the block description part described as "unit name="XYZ-9101_CPU"" in the functional block index information 51.

In addition, as shown in FIG. 11, the key device name extracting unit 162 extracts the intra-unit key device name 987654321 from the key device description part described as "pn="987654321" quantity="1"" in the functional block index information 51.

The functional block information extracting unit 152 supplies the extracted functional block name, the extracted functional block unit name, and the extracted intra-unit key device name to the functional block mounting area extracting unit 153. The functional block information extracting unit 152 also supplies the extracted intra-unit key device name to the library searching unit 154.

On the basis of the extracted functional block name, the extracted functional block unit name, and the extracted intra-unit key device name, the functional block mounting area extracting unit 153 extracts area data indicating an area on a board which area is necessary to mount parts constituting the function from the functional block parts configuration information database 52. The functional block mounting area extracting unit 153 calculates an area on a board which area is necessary to mount parts for each function. The functional block mounting area extracting unit 153 supplies the mounting area model generating unit 155 with data indicating an area on a board which area is calculated for each function and is necessary to mount the parts.

For example, as shown in FIG. 12, the functional block mounting area extracting unit 153 extracts the device identifying data XYZ-9101 and the function identifying data CPU from the functional block unit name XYZ-9101_CPU. Then, the functional block mounting area extracting unit 153 reads the part numbers "987654321" to "990000007" and the area data "1939.9", "1.6", and "5.0" associated with these part numbers, the part numbers and the area data being stored in association with a block name matching the functional block name "HOST" and a unit name matching the function identifying data "CPU" identifying the function of the other device, from data on parts used in the device identified by XYZ-9101 in the data stored in the functional block parts configuration information database 52.

The functional block mounting area extracting unit 153 calculates an area on a board which area is necessary to mount the parts by adding together the read area data (values of the read area data). For example, the functional block mounting area extracting unit 153 calculates, for each function, an area on a board which area is necessary to mount other parts than a key device by adding together the read area data (values of the read area data) of the other parts than the key device. Alternatively, the functional block mounting area extracting unit 153 calculates, for each function, an area on a board which area is necessary to mount the parts of the function by adding together all of the read area data (values of all of the read area data).

The library searching unit 154 retrieves, for each function, shape data representing the three-dimensional shape of a key device from the the 3D part shape data library 62 on the basis of the intra-unit key device name. The library searching unit 154 supplies the retrieved shape data to the mounting area model generating unit 155.

Figure 13:
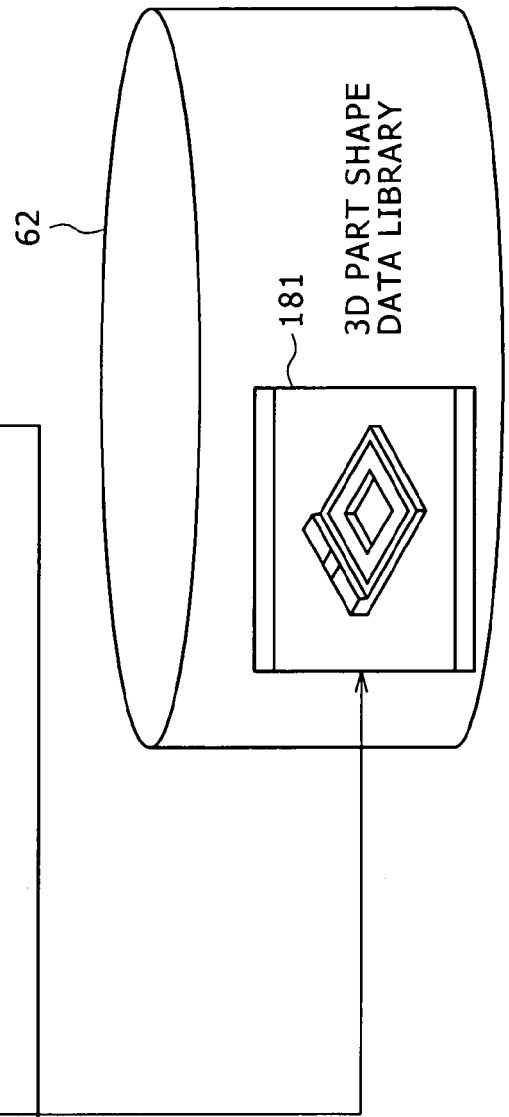
FIG. 13 is a diagram of assistance in explaining a process of the functional block mounting area extracting unit.

For example, as shown in FIG. 13, the library searching unit 154 retrieves shape data 181 identified by the intra-unit key device name "987654321" from the 3D part shape data library 62.

Incidentally, the functional block mounting area extracting unit 153 may calculate an area on a board which area is necessary to mount other parts than a key device for each function, or calculate an area on a board which area is necessary to mount all parts for each function.

For example, when the functional block mounting area extracting unit 153 reads the part numbers "987654321" to "990000007" and one piece of area data "1939.9", six pieces of area data "1.6", and five pieces of area data "5.0" that are associated with these part numbers from the functional block parts configuration information database 52 shown in FIG. 9 on the basis of the functional block name "HOST" and the function identifying data "CPU" identifying the function of the other device, the functional block mounting area extracting unit 153 calculates, as an area on a board which area is necessary to mount other parts than a key device, an area of 34.6 square millimeters (1.6×6+5.0×5) on the board which area is necessary to mount the other parts.

For example, when the functional block mounting area extracting unit 153 reads the part numbers "987654220" to "990000011" and one piece of area data "1834.6", four pieces of area data "1.6", two pieces of area data "5.0", and three pieces of area data "2.9" that are associated with these part numbers from the functional block parts configuration information database 52 shown in FIG. 9 on the basis of the functional block name "HOST" and the function identifying data "GMCH" identifying the function of the other device, the functional block mounting area extracting unit 153 calculates, as an area on a board which area is necessary to mount other parts than a key device, an area of 25.1 square millimeters (1.6×4+5.0×2+2.9×3) on the board which area is necessary to mount the other parts.

Figure 14:
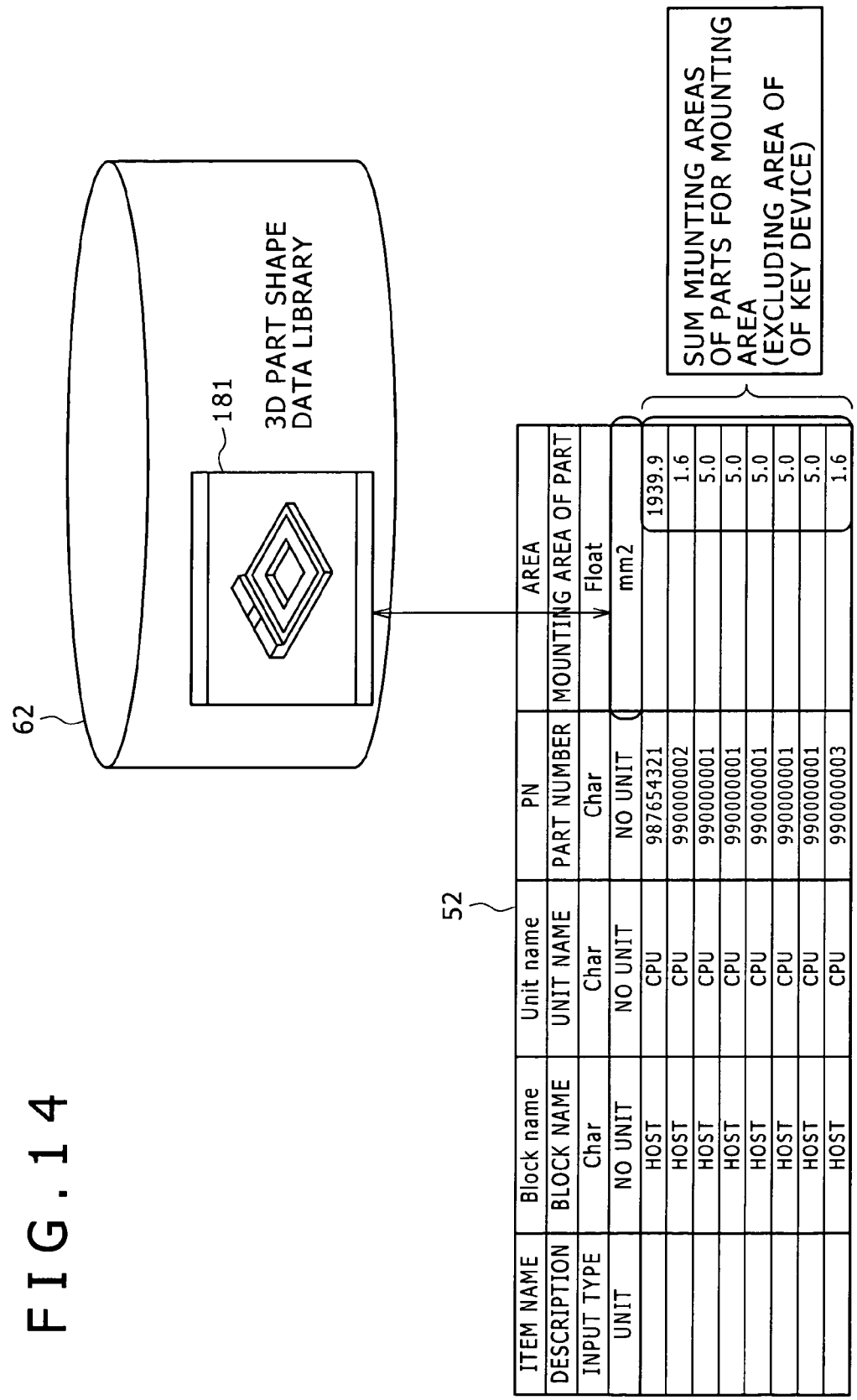
FIG. 14 is a diagram of assistance in explaining a process of the functional block mounting area extracting unit.

When an area on a board which area is necessary to mount other parts than a key device is calculated, area data other than area data associated with the same part number as the intra-unit key device name is added together, as shown in FIG. 14. In other words, the mounting areas of parts excluding the area of the key device are summed as a mounting area, whereby the area on a board which area is necessary to mount the parts of each function is calculated.

Alternatively, for example, when the functional block mounting area extracting unit 153 reads the part numbers "987654321" to "990000007" and one piece of area data "1939.9", six pieces of area data "1.6", and five pieces of area data "5.0" that are associated with these part numbers from the functional block parts configuration information database 52 shown in FIG. 9 on the basis of the functional block name "HOST" and the function identifying data "CPU" identifying the function of the other device, the functional block mounting area extracting unit 153 calculates, as an area on a board which area is necessary to mount all parts, an area of 1974.5 square millimeters (1939.9+1.6× 6+5.0×5) on the board which area is necessary to mount the parts.

Returning to FIG. 10, the mounting area model generating unit 155 generates, for each function, mounting surface shape data representing the shape of a surface on which the parts are mounted on the basis of the shape data representing the three-dimensional shape of the key device and data indicating the area on the board.

When the functional block mounting area extracting unit 153 calculates an area on a board which area is necessary to mount parts other than a key device for each function, for example, the mounting area model generating unit 155 generates mounting surface shape data for displaying a shape that surrounds a model of the key device for each function. More specifically, on the basis of a two-dimensional shape obtained by projecting the shape of the key device on the board, the mounting area model generating unit 155 generates mounting surface shape data representing the shape of a region as the area on the board which area is necessary to mount the parts other than the key device by making the shape of the region similar to the two-dimensional shape and expanding an outer boundary of the two-dimensional shape.

The mounting area model generating unit 155 supplies the shape data representing the three-dimensional shape of the key device and the mounting surface shape data to the functional block display controlling unit 63.

The functional block display controlling unit 63 controls display of a model representing the three-dimensional shape of the key device on the display of the output unit 17 on the basis of the shape data, and controls display of a model representing the two-dimensional shape of the surface on which the parts are mounted on the display of the output unit 17 on the basis of the mounting surface shape data.

Images displayed by the 3D floorplanning apparatus 1 will next be described with reference to FIGS. 15 to 20.

Figure 15:
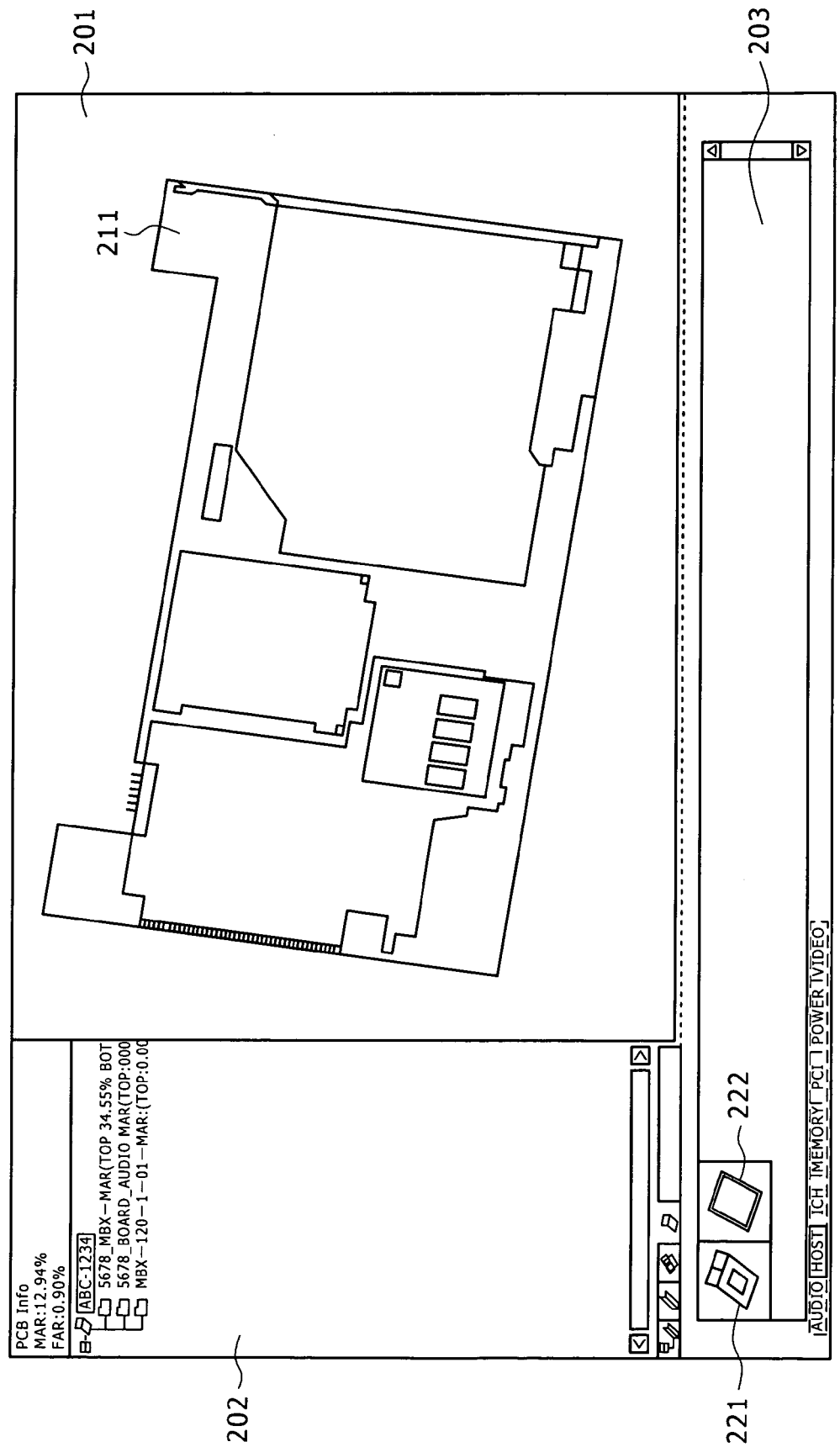
FIG. 15 is a diagram of assistance in explaining an image displayed by the 3D floorplanning apparatus.

The 3D floorplanning apparatus 1 displays an image shown in FIG. 15, for example, on the output unit 17 as display. The screen of the output unit 17 as display is divided into a model display area 201 for displaying a model representing a two-dimensional or three-dimensional shape, a functional configuration display area 202 representing a board configuration and a functional configuration of a device by a functional block tree of a tree structure, and a functional block display area 203 for allowing selection of a function (key device).

The model display area 201 disposed on an upper right side of the screen displays a model 211 representing the three-dimensional shape of the inside of a casing of a device to be designed and the three-dimensional shape of a board of the device on the basis of the rough layout information 53, for example. A viewpoint with respect to reference coordinates, the position of a light source, and the position of the model are changed in response to an operation of the input unit 16 by the user, and the image of the model in the model display area 201 is correspondingly changed.

The functional configuration display area 202 disposed on an upper left side of the screen displays a board configuration by a functional block tree as a list of a tree structure. For example, when the board of the device to be designed includes one motherboard and two daughterboards, the functional configuration display area 202 displays items corresponding to the one motherboard and the two daughterboards. Incidentally, the configuration of the board of the device to be designed is described in the rough layout information 53.

The functional block display area 203 disposed on a lower side of the screen displays a tab for selection of a block. For example, in the example shown in FIG. 15, the functional block display area 203 displays a tab indicating characters of one of "AUDIO", "HOST", "ICH", "MEMORY", "PCI", "POWER", and "VIDEO". The characters on the tab in the functional block display area 203 are displayed according to a functional block name in the functional block index information 51.

Figure 16:
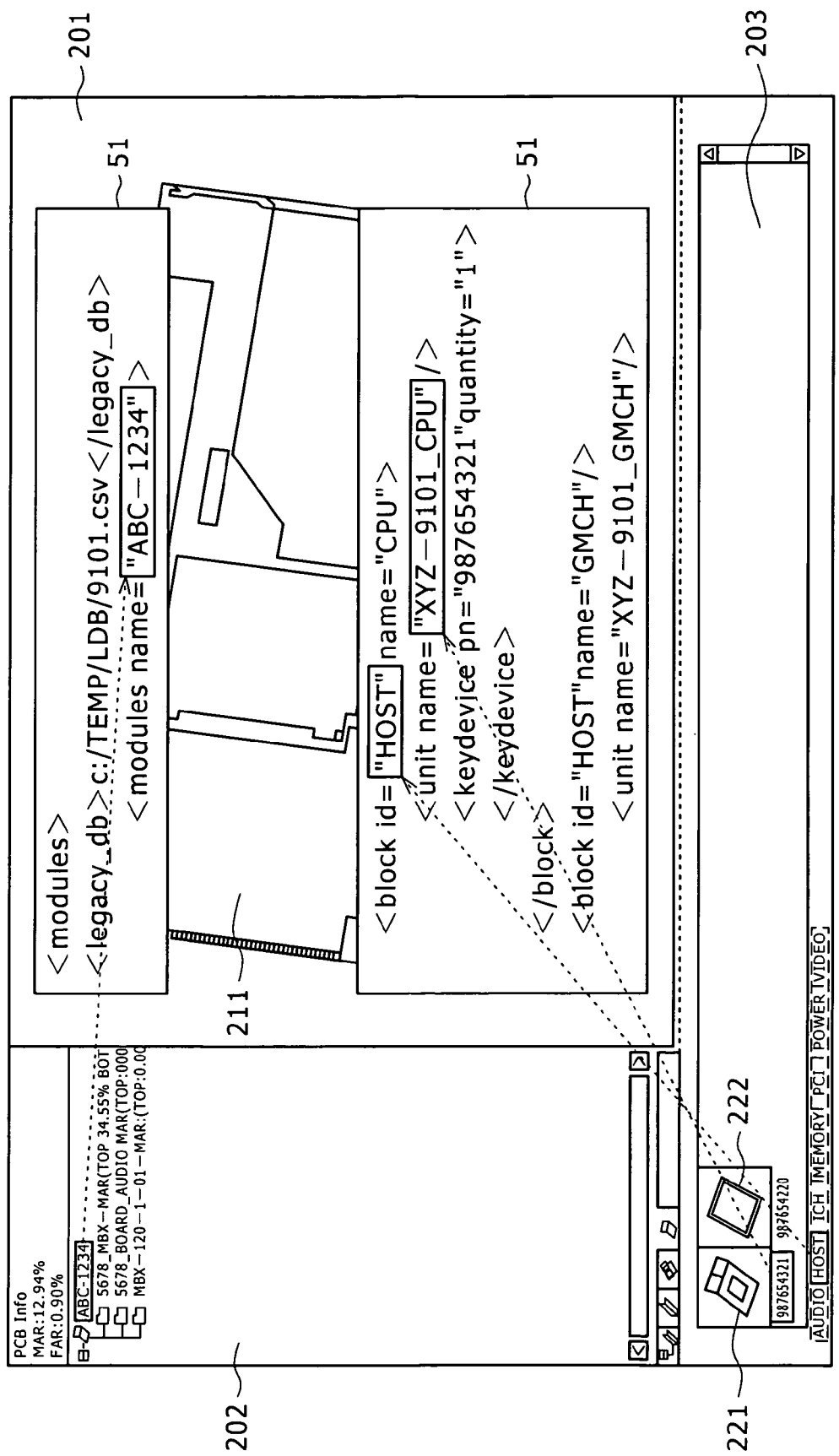
FIG. 16 is a diagram of assistance in explaining an image displayed by the 3D floorplanning apparatus.

As shown in FIG. 16, when the tab displayed as "HOST" is selected, for example, the functional block display area 203 displays a reduced image 221 and a reduced image 222 of an external shape of a key device described in a unit description part under the block description part having the functional block name HOST in the functional block index information 51. For example, the reduced image 221 is an image of the key device of the function identified by the functional block name "HOST" and the function identifying data "CPU". Similarly, the reduced image 222 is an image of the key device of the function identified by the functional block name "HOST" and the function identifying data "GMCH".

A device name is displayed at a root of the functional block tree of a tree structure representing the board configuration which tree is displayed in the functional configuration display area 202. That is, the device name ABC-1234 described in the model description part in the functional block index information 51 is displayed at the root, as shown in FIG. 16, for example.

Figure 17:
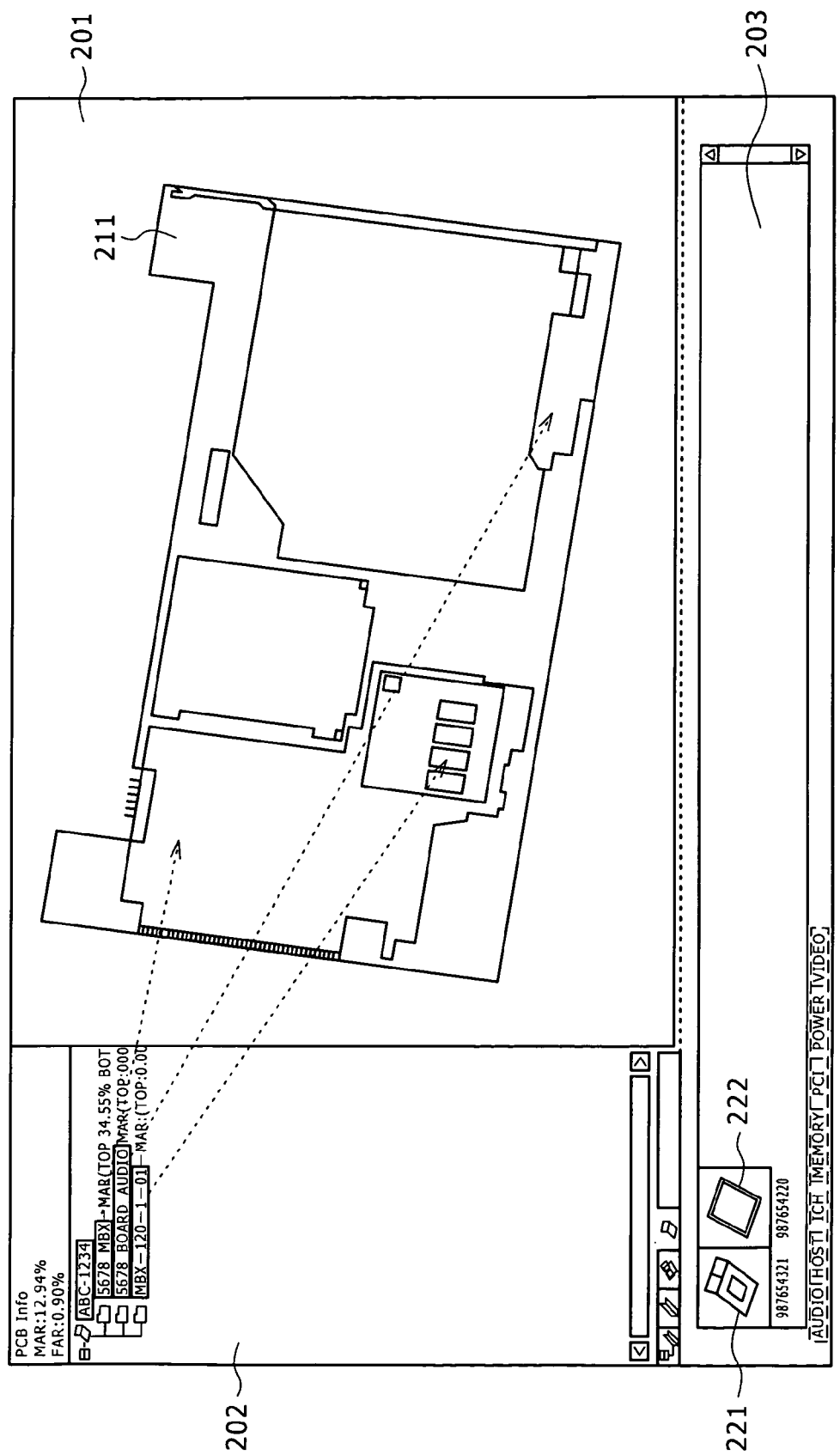
FIG. 17 is a diagram of assistance in explaining an image displayed by the 3D floorplanning apparatus.

For example, as shown in FIG. 17, when the board of the device to be designed includes one motherboard and two daughterboards, the functional block tree of the functional configuration display area 202 shows items corresponding to the one motherboard and the two daughterboards, and the model display area 201 displays the model 211 including models representing the respective shapes of the one motherboard and the two daughterboards.

Figure 18:
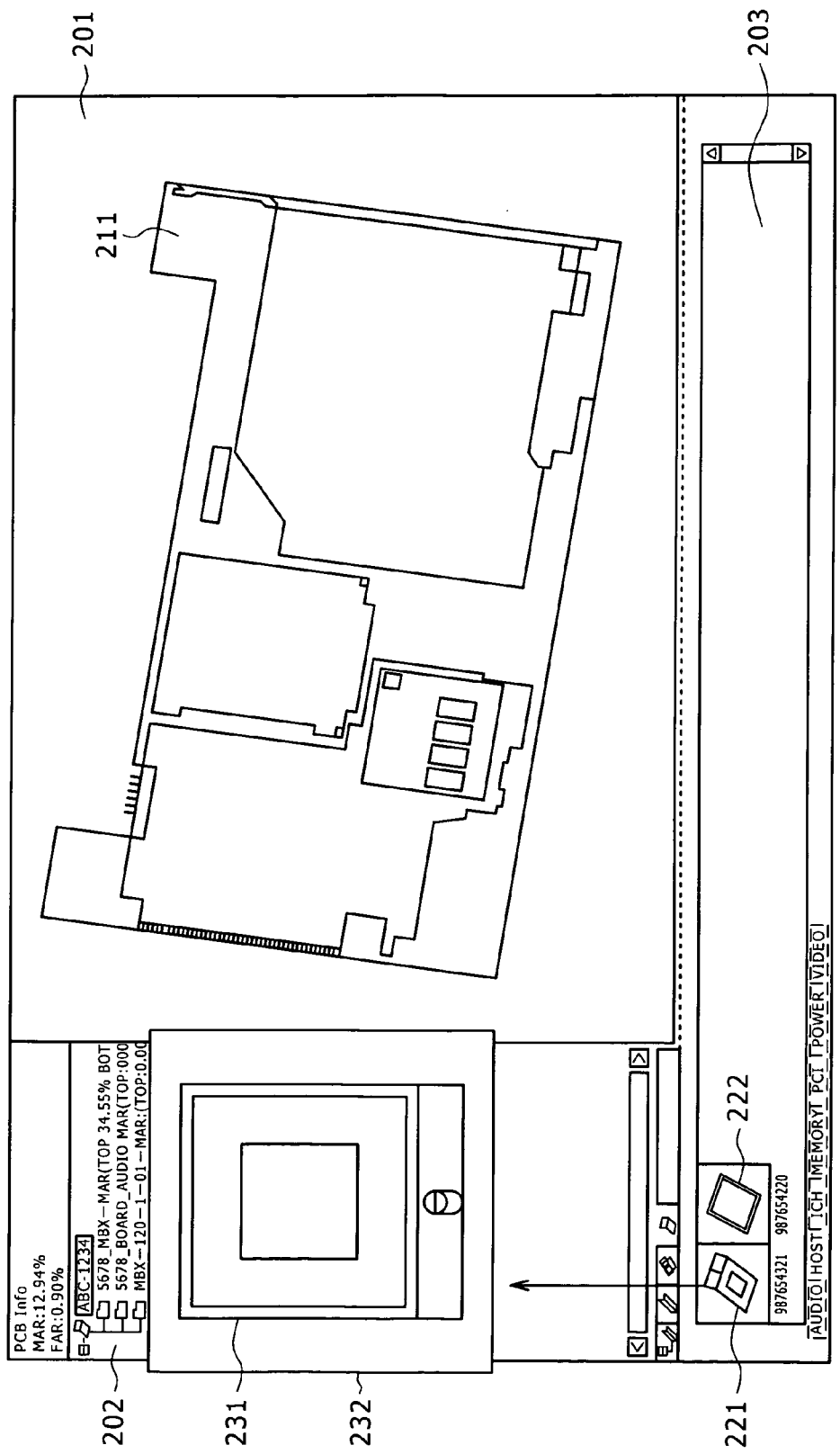
FIG. 18 is a diagram of assistance in explaining an image displayed by the 3D floorplanning apparatus.

As shown in FIG. 18, when the reduced image 221 is selected, for example, the shape data of the key device of the function identified by the functional block name "HOST" and the function identifying data "CPU" corresponding to the reduced image 221 is selected, and mounting surface shape data representing the shape of a surface for mounting the parts of the function identified by the functional block name "HOST" and the function identifying data "CPU" corresponding to the reduced image 221 is selected. A model 231 representing the three-dimensional shape of the key device is displayed on the basis of the shape data of the key device, and a model 232 representing the two-dimensional shape of the surface on which the parts are mounted is displayed on the basis of the mounting surface shape data.

For example, when the mounting surface shape data is generated on the basis of a calculated area on a board which area is necessary to mount the parts other than the key device, the model 232 is displayed so as to surround the perimeter of the model 231. For example, the model 231 and the model 232 are combined with each other to be handled as one model.

Figure 19:
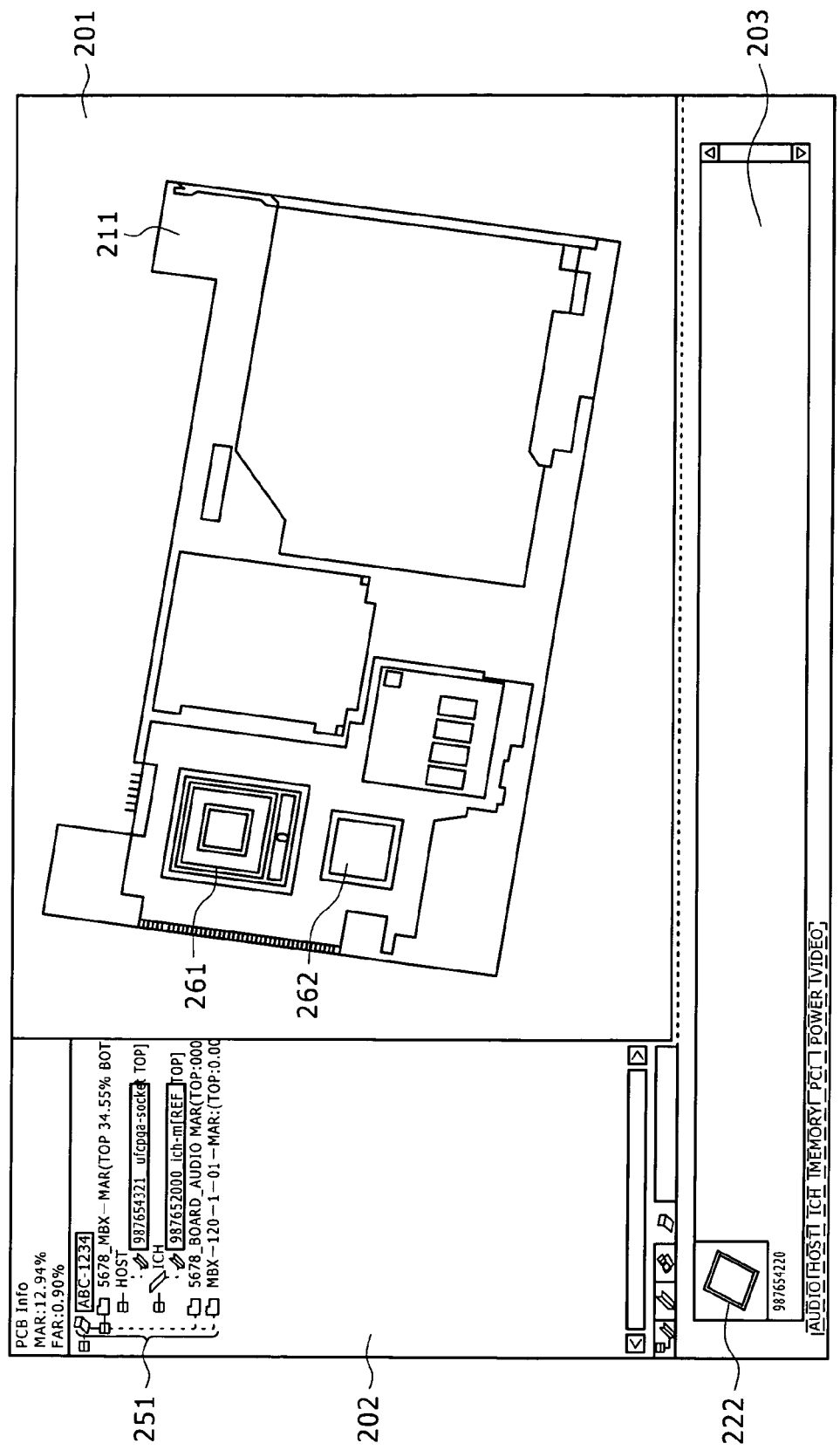
FIG. 19 is a diagram of assistance in explaining an image displayed by the 3D floorplanning apparatus.
Figure 20:
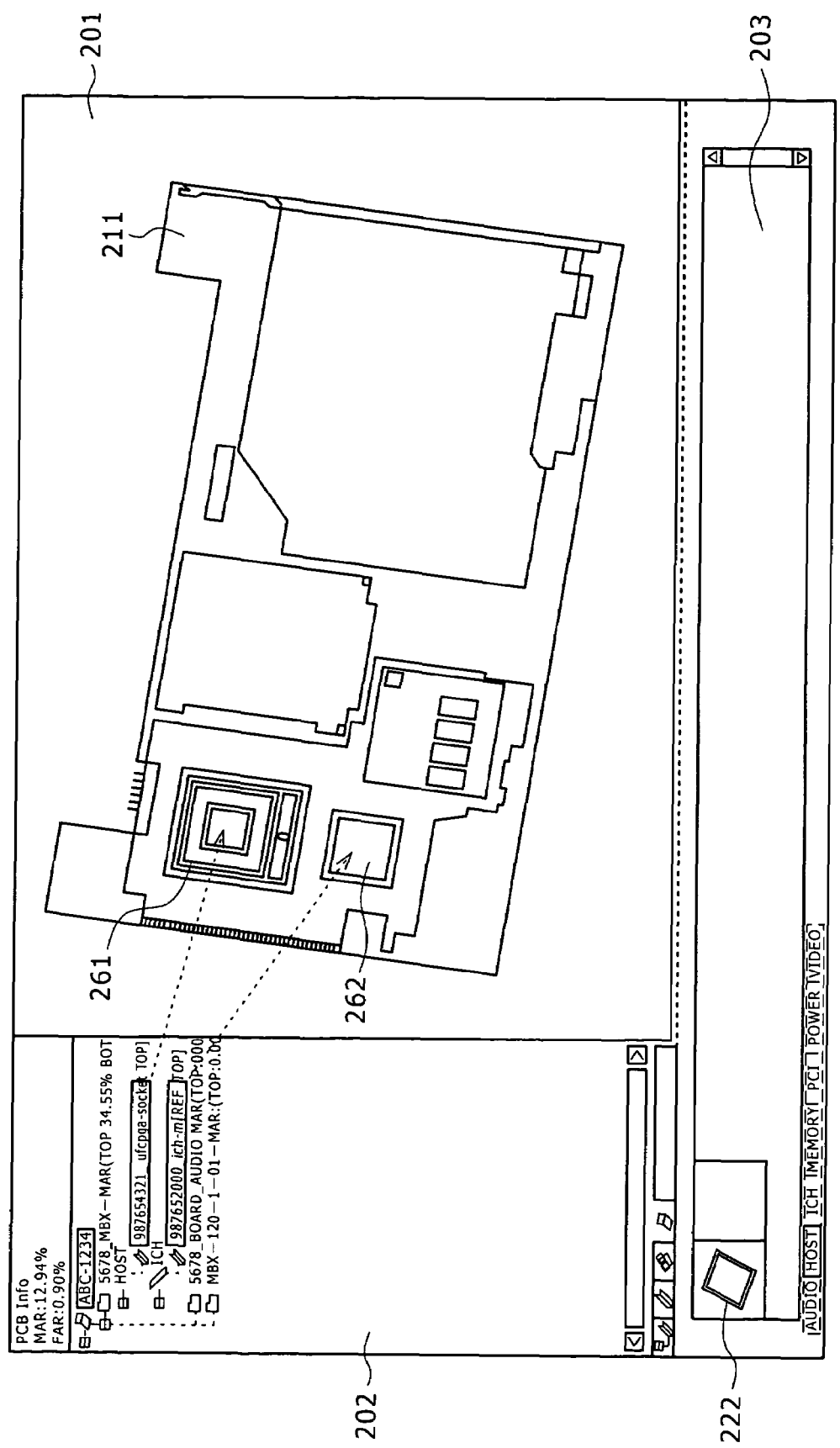
FIG. 20 is a diagram of assistance in explaining an image displayed by the 3D floorplanning apparatus.

As shown in FIG. 19 and FIG. 20, when a model 261 formed by the model 231 and the model 232 is disposed on a model of the motherboard of the model 211, for example, an item indicating information on the model 231 is displayed under the item corresponding to the motherboard in the functional configuration display area 202. Specifically, the functional block name "HOST" and the part number of the key device of the model 231 are displayed under the item corresponding to the motherboard in the functional configuration display area 202.

Incidentally, the item corresponding to the motherboard in the functional configuration display area 202 shows a ratio (mounting ratio) of an area occupied by the model 231 and the model 232 to an area of the whole motherboard.

Similarly, when the reduced image 222 is selected, and a model 262 displayed on the basis of the shape data of the key device of the function identified by the functional block name "HOST" and the function identifying data "GMCH" corresponding to the reduced image 222 and mounting surface shape data representing the shape of a surface for mounting the parts of the function is disposed on the model of the motherboard of the model 211, for example, an item indicating information on the model 262 is further displayed under the item corresponding to the motherboard in the functional configuration display area 202.

Figure 21:
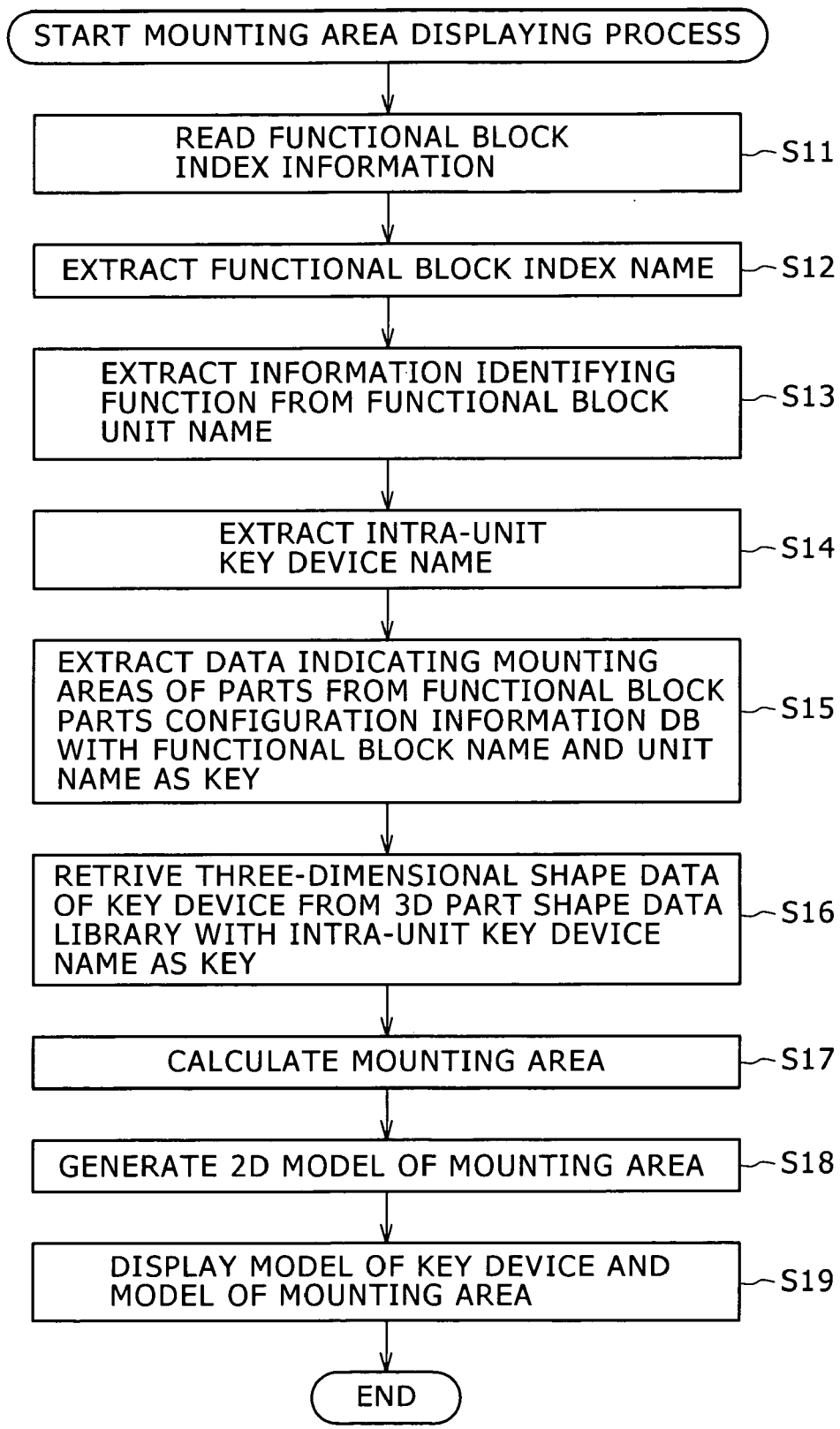
FIG. 21 is a flowchart of assistance in explaining a mounting area displaying process.

A mounting area display process by the 3D floorplanning apparatus 1 executing a 3D floorplanning program will next be described with reference to a flowchart of FIG. 21. In step S11, the functional block mounting area extracting unit 61 reads the functional block index information 51 via the input interface 151. In step S12, the functional block information extracting unit 152 extracts a functional block name representing the name of a block from the functional block index information 51.

In step S13, the functional block name extracting unit 161 in the functional block information extracting unit 152 also extracts a functional block unit name disposed in correspondence with each functional block name from the functional block index information 51. The functional block name extracting unit 161 further extracts, from the functional block unit name, device identifying data identifying another device already designed and function identifying data identifying a function of the other device which function corresponds to a function of a device to be designed.

Incidentally, the functional block mounting area extracting unit 153 may extract the device identifying data and the function identifying data from the functional block unit name.

In step S14, the key device name extracting unit 162 in the functional block information extracting unit 152 extracts an intra-unit key device name disposed in correspondence with each functional block name from the functional block index information 51.

In step S15, on the basis of the extracted functional block name, the extracted functional block unit name, and the extracted intra-unit key device name, the functional block mounting area extracting unit 153 extracts area data indicating areas necessary to mount parts constituting the function on a board from the functional block parts configuration information database 52 with the functional block name and the function identifying data as a key. For example, in step S15, the functional block mounting area extracting unit 153 extracts the area data indicating the areas necessary to mount the parts constituting the function on a board from information on the parts used in the device identified by the device identifying data in the parts information stored in the functional block parts configuration information database 52 with the functional block name and the function identifying data as a key. In step S16, the library searching unit 154 retrieves, for each function, shape data representing the three-dimensional shape of a key device from the 3D part shape data library 62 with the intra-unit key device name as a key.

In step S17, the functional block mounting area extracting unit 153 calculates a mounting area necessary to mount the parts on a board by adding together the read area data (values of the read area data). Incidentally, the mounting area model generating unit 155 or the functional block mounting area extracting unit 61 may calculate the mounting area necessary to mount the parts on a board, or a function for calculating the mounting area may be provided independently.

In step S18, the mounting area model generating unit 155 generates a two-dimensional model of the mounting area as a surface on which the parts are mounted by generating mounting surface shape data representing the shape of the surface on which the parts are mounted on the basis of the shape data representing the three-dimensional shape of the key device and data indicating the area on a board. Incidentally, the model of the mounting area may be a two-dimensional model that does not have thickness data, or may be a three-dimensional model having a zero thickness.

In step S19, the functional block display controlling unit 63 displays a model representing the three-dimensional shape of the key device on the basis of the shape data and displays the model representing the two-dimensional shape of the mounting area on which the parts are mounted on the basis of the mounting surface shape data on the display of the output unit 17. Thereby the process is ended.

Figure 22:
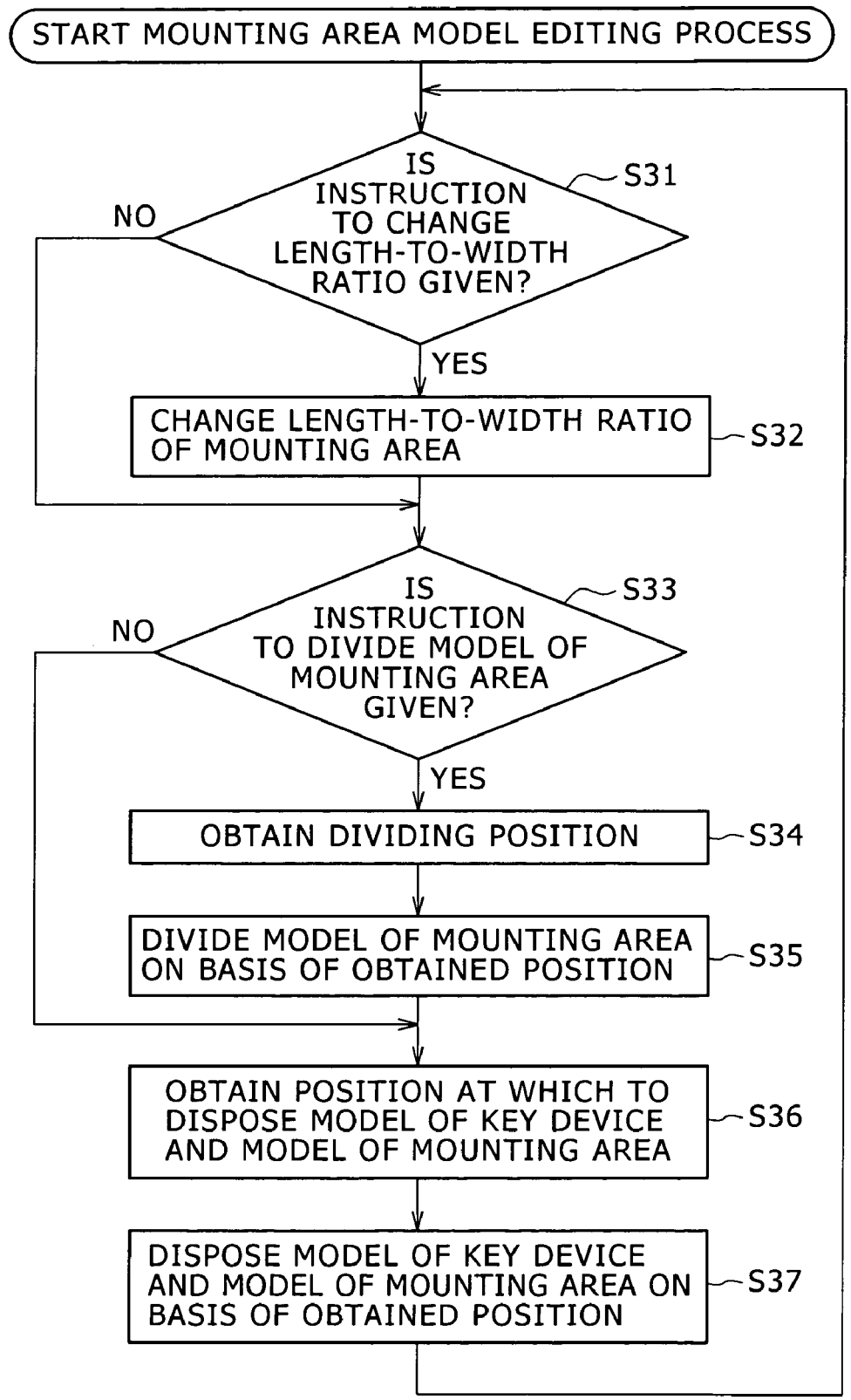
FIG. 22 is a flowchart of assistance in explaining a mounting area model editing process.

A process of editing a model of a mounting area will next be described with reference to a flowchart of FIG. 22. In step S31, the functional block mounting area graphic processing unit 65 determines whether an instruction to change a length-to-width ratio of the mounting area as a surface on which parts are mounted is given on the basis of a signal from the input unit 16 which signal corresponds to an operation by the user. When the functional block mounting area graphic processing unit 65 determines that an instruction to change the length-to-width ratio of the mounting area is given, the process proceeds to step S32, where the length-to-width ratio of the mounting area is changed according to the instruction. The process then proceeds to step S33.

More specifically, in step S32, the functional block mounting area graphic processing unit 65 changes the length-to-width ratio of a model of the mounting area by changing mounting surface shape data for displaying the mounting area (changing values representing a shape which values are included in the mounting surface shape data) according to the specified length-to-width ratio of the mounting area.

When the functional block mounting area graphic processing unit 65 determines in step S31 that an instruction to change the length-to-width ratio of the mounting area is not given, the process of step S32 is skipped, and the process proceeds to step S33.

In step S33, the functional block mounting area graphic processing unit 65 determines whether an instruction to divide the model of the mounting area is given on the basis of a signal from the input unit 16 which signal corresponds to an operation by the user. When the functional block mounting area graphic processing unit 65 determines that an instruction to divide the mounting area is given, the process proceeds to step S34. In step S34, the functional block mounting area graphic processing unit 65 obtains a mounting area dividing position on the basis of a signal from the input unit 16 which signal corresponds to an operation by the user. In step S35, the functional block mounting area graphic processing unit 65 divides the model of the mounting area on the basis of the obtained position. The process then proceeds to step S36. More specifically, in step S35, the functional block mounting area graphic processing unit 65 divides the model of the mounting area by generating two pieces of mounting surface shape data according to the specified mounting area dividing position from one piece of mounting surface shape data for displaying the mounting area.

When the functional block mounting area graphic processing unit 65 determines in step S33 that an instruction to divide the model of the mounting area is not given, the process of step S34 and step S35 is skipped, and the process proceeds to step S36.

The functional block mounting area graphic processing unit 65 supplies the mounting surface shape data generated or changed in the process of steps S31 to S35 to the functional block partitioning unit 64.

In step S36, the functional block partitioning unit 64 obtains a position at which to dispose a model of a key device and the model of the mounting area divided or changed in the length-to-width ratio with respect to a three-dimensional model representing the shape of a board and a three-dimensional model representing the shape of a casing by obtaining a signal from the input unit 16 which signal corresponds to an operation by the user.

In step S37, the functional block partitioning unit 64 disposes the model of the key device and the model of the mounting area with respect to the three-dimensional model representing the shape of the board and the three-dimensional model representing the shape of the casing. The process returns to step S31 to repeat the above-described process.

As described above, for each function of a device to be designed, a model representing the three-dimensional shape of a key device of the function and a model representing the two-dimensional shape of a plane on a board which plane is necessary to arrange parts of the function can be readily displayed.

By arranging the model of the key device and the model of the plane on the board, it is possible to readily check arrangements on the board and check for interference between parts inside a casing. When the model of the plane on the board is disposed so as to be adjacent to the model of the key device in principle, the arrangement can be considered while satisfying requirements for signal transmission and the like.

When a model of a key device and a model of a plane on a board is disposed for each of a plurality of functions with respect to a model of the board and a model of the inside of a casing, it is possible to readily check arrangements on the board and check for interference between parts inside the casing while considering mutual relations between functional arrangements.

Further, since very small parts compared with a key device increased in size, such as a chip resistance, a chip capacitor and the like, are integrated into one model of a plane on a board, a convenience of being unable to view the whole of the key device when display is made so that the small parts can be viewed or conversely being unable to view the small parts when the whole of the key device is displayed is eliminated. It is therefore possible to consider functional arrangements more quickly.

It is to be noted that the forms of data representing shapes and the forms of models displayed do not limit the present invention. For example, the displayed models may be either frame models, surface models, solid models, or the like.

Thus, when a three-dimensional model representing the shape of parts forming a device is displayed, an arrangement of the parts on the board of the electronic device can be considered. In addition, when extracting device identifying data, function identifying data, and core part identifying data for each function of a device to be designed, from configuration information indicating a configuration of functions of the device to be designed, the configuration information including the device identifying data identifying another device already designed, the function identifying data identifying a function of the other device corresponding to each of the functions of the device, and the core part identifying data identifying a core part as a core of a function of the device to be designed, extracting area data corresponding to the extracted device identifying data and the extracted function identifying data for each function of the device to be designed, from parts information representing information on parts of the other device, the parts information including the area data indicating an area necessary to mount the parts in correspondence with the device identifying data and the function identifying data, extracting part shape data representing a three-dimensional shape of the core part identified by the extracted core part identifying data for each function of the device to be designed, from a set of part shape data representing three-dimensional shapes of parts, generating, for each function of the device to be designed, mounting surface shape data representing a shape of a surface on which the parts of the function of the device are mounted on a basis of the extracted area data, and controlling display of a model representing the three-dimensional shape of the core part and a model representing the shape of the surface on which the parts are mounted on a basis of the part shape data and the mounting surface shape data, it is possible to consider an arrangement of the parts on the board of the electronic device more easily while the three-dimensional shape is displayed.

The series of processes described above can be carried out not only by hardware but also by software. When the series of processes is to be carried out by software, a program constituting the software is installed from a recording medium onto a computer incorporated in special hardware, or a general-purpose personal computer, for example, that can perform various functions by installing various programs thereon.

As shown in FIG. 1, the recording medium is not only formed by a packaged medium distributed to users to provide the program separately from the computer and having the program recorded thereon, the packaged medium including the magnetic disk 31 (including flexible disks), the optical disk 32 (including CD-ROM (Compact Disk-Read Only Memory) and DVD (Digital Versatile Disk)), the magneto-optical disk 33 (including MD (MiniDisk) (trademark)), the semiconductor memory 34 or the like, but also formed by the ROM 12, a hard disk included in the recording unit 18, or the like where the program is recorded and which is provided to the user in a state of being preincorporated in the computer.

Incidentally, the program for performing the series of processes may be installed onto a computer via an interface such as a router, a modem or the like and via a wire or wireless communication medium such as a local area network, the Internet, digital satellite broadcasting or the like as required.

In addition, in the present specification, the steps describing the program stored on the recording medium include not only processes carried out in time series in the described order but also processes carried out in parallel or individually and not necessarily in time series.

It is to be noted that in the present specification, a system refers to an apparatus as a whole formed by a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for displaying models representing shapes to assist design of a device having a plurality of functions, said information processing apparatus comprising:

first extracting means for extracting (1) device identifying data, (2) function identifying data, and (3) core part identifying data for each function of the plurality of functions of said device to be designed, from configuration information indicating a configuration of the plurality of functions of said device to be designed, the configuration information including said device identifying data identifying another device already designed, said function identifying data identifying a function of said other device corresponding to each of the functions of said device, and said core part identifying data identifying a core part as a core of a function of said device to be designed, wherein the configuration information is organized based on the plurality of functions of the device;

second extracting means for extracting area data corresponding to the extracted device identifying data and the extracted function identifying data for each function of said device to be designed, from parts information representing information on parts of said other device, the parts information including said area data indicating an area necessary to mount said parts in correspondence with said device identifying data and said function identifying data;

third extracting means for extracting part shape data representing a three-dimensional shape of said core part identified by the extracted core part identifying data for each function of said device to be designed, from a set of part shape data representing three-dimensional shapes of said parts;

generating means for generating, for each function of said device to be designed, mounting surface shape data representing a shape of a surface on which said parts of the function of said device are mounted on a basis of the extracted area data; and display controlling means for controlling display of a model representing the three-dimensional shape of said core part and a model representing the shape of the surface on which said parts are mounted on a basis of said part shape data and said mounting surface shape data.

2. The information processing apparatus as claimed in claim 1, further comprising editing means for editing said mounting surface shape data so as to divide said model representing the shape of the surface on which said parts are mounted.

3. The information processing apparatus as claimed in claim 1, further comprising editing means for editing said mounting surface shape data so as to change a shape of said model representing the shape of the surface on which said parts are mounted while maintaining an area of the surface on which said parts are mounted.

4. The information processing apparatus as claimed in claim 1, wherein said generating means generates said mounting surface shape data representing the shape of the surface on which of said parts of each function of said device, said parts excluding said core part are mounted.

5. The information processing apparatus as claimed in claim 4, wherein said display controlling means controls the display of the model representing the three-dimensional shape of said core part and the model representing the shape of the surface on which said parts are mounted such that the model representing the shape of the surface on which said parts are mounted is displayed adjoining the model representing the three-dimensional shape of said core part.

6. An information processing method for displaying models representing shapes to assist design of a device having a plurality of functions, said information processing method comprising:

a first extracting step of extracting device (1) identifying data, (2) function identifying data, and (3) core part identifying data for each function of the plurality of functions of said device to be designed, from configuration information indicating a configuration of the plurality of functions of said device to be designed, the configuration information including said device identifying data identifying another device already designed, said function identifying data identifying a function of said other device corresponding to each of the functions of said device, and said core part identifying data identifying a core part as a core of a function of said device to be designed, wherein the configuration information is organized based on the plurality of functions of the device;

a second extracting step of extracting area data corresponding to the extracted device identifying data and the extracted function identifying data for each function of said device to be designed, from parts information representing information on parts of said other device, the parts information including said area data indicating an area necessary to mount said parts in correspondence with said device identifying data and said function identifying data;

a third extracting step of extracting part shape data representing a three-dimensional shape of said core part identified by the extracted said core part identifying data for each function of said device to be designed, from a set of part shape data representing three-dimensional shapes of said parts;

a generating step of generating, for each function of said device to be designed, mounting surface shape data representing a shape of a surface on which said parts of the function of said device are mounted on a basis of the extracted area data; and a display controlling step of controlling display of a model representing the three-dimensional shape of said core part and a model representing the shape of the surface on which said parts are mounted on a basis of said part shape data and said mounting surface shape data.

7. A computer recordable medium having embedded therein a program for making a computer perform information processing for displaying models representing shapes to assist design of a device having a plurality of functions, said program comprising:

a first extracting step of extracting (1) device identifying data, (2) function identifying data, and (3) core part identifying data for each function of the plurality of functions of said device to be designed, from configuration information indicating a configuration of the plurality of functions of said device to be designed, the configuration information including said device identifying data identifying another device already designed, said function identifying data identifying a function of said other device corresponding to each of the functions of said device, and said core part identifying data identifying a core part as a core of a function of said device to be designed, wherein the configuration information is organized based on the plurality of functions of the device;

a second extracting step of extracting area data corresponding to the extracted device identifying data and the extracted function identifying data for each function of said device to be designed, from parts information representing information on parts of said other device, the parts information including said area data indicating an area necessary to mount said parts in correspondence with said device identifying data and said function identifying data;

a third extracting step of extracting part shape data representing a three-dimensional shape of said core part identified by the extracted core part identifying data for each function of said device to be designed, from a set of part shape data representing three-dimensional shapes of said parts;

a generating step of generating, for each function of said device to be designed, mounting surface shape data representing a shape of a surface on which said parts of the function of said device are mounted on a basis of the extracted area data; and a display controlling step of controlling display of a model representing the three-dimensional shape of said core part and a model representing the shape of the surface on which said parts are mounted on a basis of said part shape data and said mounting surface shape data.

8. An information processing apparatus for displaying models representing shapes to assist design of a device having a plurality of functions, said information processing apparatus comprising:

a first extractor configured to extract (1) device identifying data, (2) function identifying data, and (3) core part identifying data for each function of said device to be designed, from configuration information indicating a configuration of the plurality of functions of said device to be designed, the configuration information including said device identifying data identifying another device already designed, said function identifying data identifying a function of said other device corresponding to each of the functions of said device, and said core part identifying data identifying a core part as a core of a function of said device to be designed, wherein the configuration information is organized based on the plurality of functions of the device;

a second extractor configured to extract area data corresponding to the extracted device identifying data and the extracted function identifying data for each function of said device to be designed, from parts information representing information on parts of said other device, the parts information including said area data indicating an area necessary to mount said parts in correspondence with said device identifying data and said function identifying data;

a third extractor configured to extract part shape data representing a three-dimensional shape of said core part identified by the extracted core part identifying data for each function of said device to be designed, from a set of part shape data representing three-dimensional shapes of said parts;

a generator configured to generate, for each function of said device to be designed, mounting surface shape data representing a shape of a surface on which said parts of the function of said device are mounted on a basis of the extracted area data; and a display controller configured to control a display of a model representing the three-dimensional shape of said core part and a model representing the shape of the surface on which said parts are mounted on a basis of said part shape data and said mounting surface shape data.

9. The method of claim 6, wherein the display controlling step comprises displaying selectable tabs corresponding to each of the functions of the device, wherein, when a tab is selected for a function by a user, a reduced image of a core part corresponding to the function is displayed.

* * * * *